United States Patent
Yallamraju et al.

(10) Patent No.: US 9,880,904 B2
(45) Date of Patent: Jan. 30, 2018

(54) SUPPORTING MULTIPLE BACKUP APPLICATIONS USING A SINGLE CHANGE TRACKER

(71) Applicant: CA, INC., New York, NY (US)

(72) Inventors: Umasankar Yallamraju, Hyderabad (IN); Subrahmanya Sarma Yellapragada, Hyderabad (IN); Vijaya Kumar Pothireddy, Hyderabad (IN); Ramakrishna Maddali, Hyderabad (IN)

(73) Assignee: CA, INC., New York, NY (US)

(*) Notice: Subject to any disclaimer, the term of this patent is extended or adjusted under 35 U.S.C. 154(b) by 52 days.

(21) Appl. No.: 14/569,327

(22) Filed: Dec. 12, 2014

(65) Prior Publication Data

US 2016/0170835 A1 Jun. 16, 2016

(51) Int. Cl.
*G06F 12/00* (2006.01)
*G06F 11/14* (2006.01)

(52) U.S. Cl.
CPC ...... *G06F 11/1451* (2013.01); *G06F 11/1458* (2013.01); *G06F 2201/82* (2013.01)

(58) Field of Classification Search
CPC ............ G06F 11/1451; G06F 11/1446; G06F 11/1448; G06F 11/1435; G06F 11/1464; G06F 11/1469; G06F 2201/84
See application file for complete search history.

(56) References Cited

U.S. PATENT DOCUMENTS

| | | | | |
|---|---|---|---|---|
| 6,038,639 | A | 3/2000 | O'Brien | |
| 6,061,770 | A * | 5/2000 | Franklin | G06F 11/1466 711/161 |
| 6,367,029 | B1 * | 4/2002 | Mayhead | G06F 11/1625 709/203 |
| 6,934,822 | B2 * | 8/2005 | Armangau | G06F 11/1435 707/999.01 |
| 7,165,154 | B2 * | 1/2007 | Coombs | G06F 11/1448 711/162 |
| 7,165,155 | B1 * | 1/2007 | Duprey | G06F 11/1451 711/162 |
| 7,237,075 | B2 * | 6/2007 | Welsh | G06F 11/1451 711/159 |
| 7,770,059 | B1 * | 8/2010 | Glade | G06F 11/0712 709/213 |
| 7,801,867 | B2 * | 9/2010 | Mittal | G06F 11/1451 707/686 |
| 7,934,064 | B1 | 4/2011 | Per | |
| 8,468,136 | B2 * | 6/2013 | Ulrich | G06F 11/1451 707/610 |
| 8,495,023 | B1 * | 7/2013 | Tsaur | G06F 11/1448 707/646 |

(Continued)

FOREIGN PATENT DOCUMENTS

NO 2012085297 A1 6/2012

*Primary Examiner* — David X Yi
*Assistant Examiner* — Francisco Grullon
(74) *Attorney, Agent, or Firm* — Fabian VanCott; Steven Nichols

(57) ABSTRACT

Supporting multiple backup applications using a single change tracker includes receiving, from a backup application, a request to associate with a backup map, replicating the backup map to create a replica backup map associated with the backup application, and updating the replica backup map based on changes in the backup map.

18 Claims, 17 Drawing Sheets

(56) References Cited

U.S. PATENT DOCUMENTS

| | | | | |
|---|---|---|---|---|
| 8,793,222 | B1* | 7/2014 | Stringham | G06F 17/30091 |
| | | | | 707/649 |
| 8,874,524 | B1* | 10/2014 | Zhao | G06F 17/30088 |
| | | | | 707/639 |
| 8,990,164 | B1* | 3/2015 | Mahajan | G06F 11/1451 |
| | | | | 707/649 |
| 9,122,711 | B1 | 9/2015 | Nicolini | |
| 9,251,151 | B1* | 2/2016 | Fang | G06F 17/3007 |
| 9,535,907 | B1* | 1/2017 | Stringham | G06F 11/1435 |
| 9,672,116 | B1 | 6/2017 | Chopra | |
| 2003/0101321 | A1* | 5/2003 | Ohran | G06F 11/1451 |
| | | | | 711/162 |
| 2005/0015685 | A1* | 1/2005 | Yamamoto | G06F 11/0727 |
| | | | | 714/54 |
| 2005/0033777 | A1* | 2/2005 | Moraes | G06F 17/30575 |
| 2005/0278465 | A1* | 12/2005 | Qi | G06F 13/387 |
| | | | | 710/36 |
| 2006/0106893 | A1* | 5/2006 | Daniels | G06F 11/1435 |
| 2006/0218203 | A1* | 9/2006 | Yamato | G06F 11/2082 |
| 2010/0005259 | A1* | 1/2010 | Prahlad | G06F 11/1435 |
| | | | | 711/162 |
| 2010/0076934 | A1* | 3/2010 | Pershin | G06F 11/1451 |
| | | | | 707/640 |
| 2010/0077160 | A1* | 3/2010 | Liu | G06F 3/0482 |
| | | | | 711/162 |
| 2010/0115332 | A1* | 5/2010 | Zheng | G06F 11/1461 |
| | | | | 714/6.2 |
| 2010/0280999 | A1* | 11/2010 | Atluri | G06F 11/1471 |
| | | | | 707/657 |
| 2011/0282843 | A1* | 11/2011 | Wang | G06F 11/1466 |
| | | | | 707/649 |
| 2012/0117342 | A1* | 5/2012 | Karonde | G06F 11/1451 |
| | | | | 711/162 |
| 2012/0209812 | A1* | 8/2012 | Bezbaruah | G06F 9/45558 |
| | | | | 707/646 |
| 2014/0078882 | A1* | 3/2014 | Maltz | H04L 41/0883 |
| | | | | 370/216 |
| 2014/0108717 | A1* | 4/2014 | Tian | G06F 3/0604 |
| | | | | 711/108 |
| 2016/0203061 | A1* | 7/2016 | Lee | G06F 11/1469 |
| | | | | 714/19 |

* cited by examiner

SUPPORTING MULTIPLE BACKUP APPLICATIONS USING A SINGLE CHANGE TRACKER

BACKGROUND

The present disclosure relates to supporting multiple backup applications, and more specifically, to supporting multiple backup applications using a single change tracker.

A network may include a number of servers. The servers, such as backup servers, store data in volatile memory and on data storage devices. A backup server may backup the data stored on other servers by utilizing a number of backup applications. Each of the backup applications determines changes that have been made to the data stored on other servers. The changes that have been made to the remote data are then made locally to the backup data.

BRIEF SUMMARY

According to one aspect of the present disclosure, a method is implemented by a backup system to support multiple backup applications using a single change tracker that includes receiving, from a backup application, a request to associate with a backup map, replicating the backup map to create a replica backup map associated with the backup application, and updating the replica backup map based on changes in the backup map.

According to one aspect of the present disclosure, a backup data system comprising at least one backup application associated with a backup server that manages a backup data set stored on a backup data storage device, a supporting system comprising a single change tracker that tracks changes in an original data set stored on a data storage device, where the original data set is backed up by the at least one backup application, the supporting system communicating with the at least one backup application; and at least one backup driver communicating with the at least one backup application through the supporting system.

According to one aspect of the present disclosure, a system for supporting multiple backup applications using a single change tracker includes a computer program product, which includes a non-transitory computer readable storage medium, the computer readable storage medium having computer readable program code embodied therewith. The computer readable program code having computer readable program code to receive, from a backup application, a request to associate with a live backup map and a consistent backup map, replicate the live backup map and the consistent backup map to create a replica live backup map and a replica consistent backup map, and update the replica live backup map and the replica consistent backup map, based on changes in the live backup map and the consistent backup map.

BRIEF DESCRIPTION OF THE DRAWINGS

Aspects of the present disclosure are illustrated by way of example and are not limited by the accompanying figures with like references indicating like elements.

Throughout the drawings, identical reference numbers designate similar, but not necessarily identical, elements.

DETAILED DESCRIPTION

Figure 1:
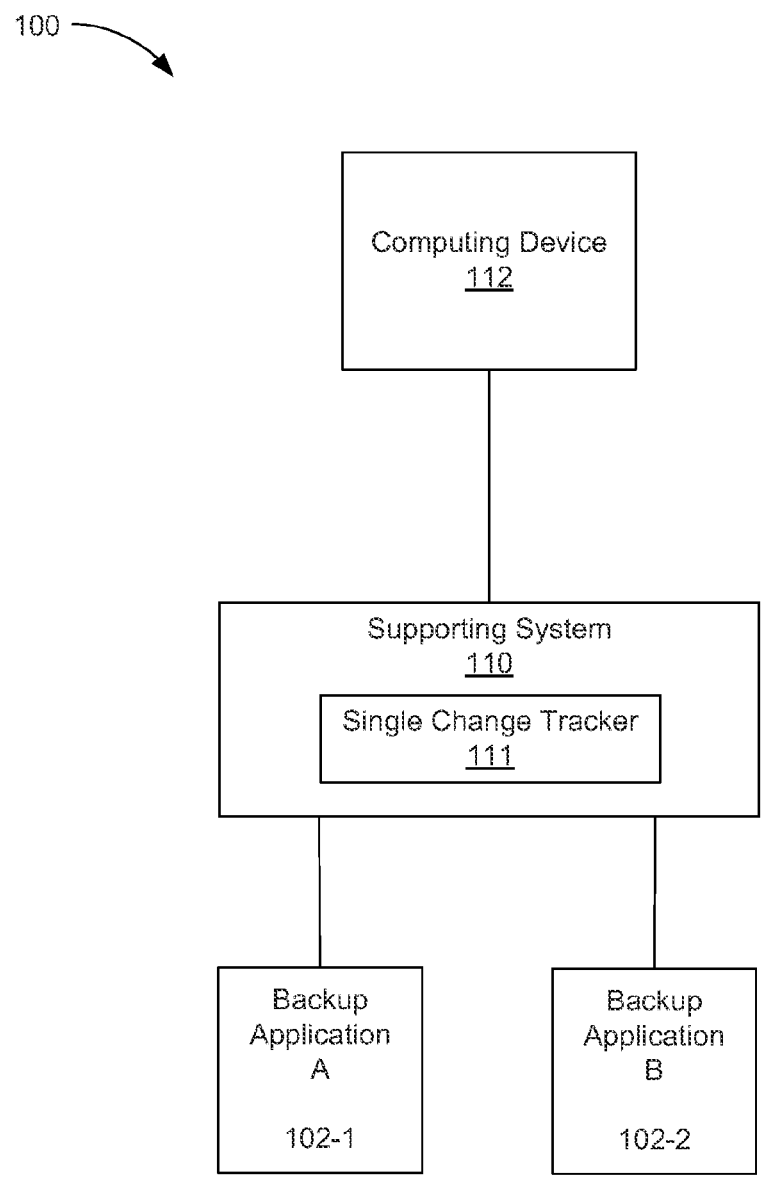
FIG. 1 illustrates a diagram of a system for supporting multiple backup applications using a single change tracker, according to one example of the principles described herein.

The present specification describes a method and system for supporting multiple backup applications using a single change tracker, such that each backup application backs up a consistent view of the data on a computing device which is being backed up.

The subject matter described herein may be a system, a method, and/or a computer program product. The computer program product may include a computer readable storage medium (or media) having computer readable program instructions thereon for causing a processor to carry out aspects of the subject matter described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but is not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but is not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment, or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, can direct a computer, other programmable data processing apparatus, or other devices to function in a particular manner, such that the instructions, when stored in the computer readable medium, produce an article of manufacture including instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The data on a computing device may be backed up by a number of backup applications operating on that computing device or another computing device. The backup applications may reduce the amount of time needed to back up the data on the computing device. However, several backup applications may operate at the same time on the backup device. Further, each backup application competes for resources of the computing device. The resources may include a backup driver, a kernel, and other resources. This competition for resources may reduce the overall performance of the backup applications backing up data on the computing device. As a result, the amount of time needed to back up the data on the computing device may be increased if several backup applications operate at the same time on the computing device.

According to the principles described here, a single change tracker may support multiple backup applications to reduce competition for the backup driver. Further, the single change tracker may be implemented in a user space to reduce the competition for the kernel. The single change tracker may provide a common interface for backup applications. The single change tracker may track changes on disks, volumes, or other storage connected to a server. The single change tracker may update backup data with changes that happen to the data on the server during the backup process.

As used in the present specification and in the appended claims, the term "a number of" or similar language may include any positive number, including one to infinity; zero not being a number, but the absence of a number.

As used in the present specification and appended claims, the term "server" means a computer device that provides services to another device or system.

As used in the present specification and appended claims, a "backup server" is a server for which the primary purpose is to backup and store data that exists originally on some client computing device. The client computing device being backed up may be the same or a different computing device from the backup server. A backup server may backup a number of client computing devices.

As used in the present specification and appended claims, a "block" means a portion of data stored on a storage device of a computing device that is read or written together as a unit of data.

As used in the present specification and appended claims, the term "change" means that data stored on a computing device has been modified. A change may indicate that the data has been added to, deleted, or set to a different value. When an original data set is changed, the same changes should be made in a corresponding backup data set so that the backup data set accurately records the state of the original data set.

As used in the present specification and appended claims, the term "backup" means a process for replicating data that is stored on a client computing device so that another copy of that data exists and can be used if the original data set is lost or compromised. For example, a backup data set is used to reduce the risk of data loss in the event of a hardware or software failure on a server. In the event of such a failure, the backup data set is used to replace the lost or damaged data set.

As used in the present specification and appended claims, the term "backup data" or "backup data set" means data which is a copy of another, original data set that has been replicated for archival purposes. The backup data may be used in the event of data loss in the original data set. The backup data may be stored and periodically updated by a backup application.

As used in the present specification and appended claims, the term "backup application" means an application that conducts a backup operation to create a backup data set from an original data set.

As used in the present specification and appended claims, the term "backup map" means information that lists what data is to be backed up by a backup application. A backup map may indicate which data in an original data set has been changed since a prior backup operation and therefore needs to be backed up in a next backup operation. Alternatively, a backup map may simply indicate that the entire original data set should be backed up in a next backup operation.

As used in the present specification and appended claims, the term "backup driver" means an interface that supports and communicates with a backup application to backup data. A backup driver may be used to track changes to an original data set.

As used in the present specification and appended claims, the term "live backup map" means a dynamic backup map reflecting portions of the original data set that have been changed or need backup at any given point in time.

As used in the present specification and appended claims, the term "consistent backup map" means a backup map that persists unchanged during a backup operation being performed by a particular backup application. The consistent backup map can be compared to a live backup map to determine what changes to the original data set may have occurred during the backup operation. Separating the consistent backup map from the live backup map allows a backup application to perform a backup without having additional data blocks be added to the backup data set during the backup operation.

As used in the present specification and appended claims, the term "replica backup map" means a copy of a backup map. The replica backup map may be associated with a particular backup application and may allow that backup application to perform a backup operation, via a supporting system, independent of any other backup application. The replica backup map may use the same data type, contain the same data and/or use the same format as the backup map. The replica backup map may include additional or alternative data to support a backup application in performing a backup operation.

As used in the present specification and appended claims, the term "replica live backup map" means a copy of a live backup map. The replica live backup map may be associated with a backup application and allow the backup application to perform a backup operation, via a supporting system, independent of other backup applications. The replica live backup map may use the same data type, contain the same data and/or use the same format as the live backup map. The replica live backup map may include additional or alternative data to support a backup application in performing a backup.

As used in the present specification and appended claims, the term "replica consistent backup map" means a copy of a consistent backup map. The replica consistent backup map may be associated with a backup application and allow the backup application to perform a backup operation, via a supporting system, independent of other backup applications. The replica consistent backup map may use the same data type as the consistent backup map, contain the same data and/or use the same format as the consistent backup map. The replica consistent backup map may include additional or alternative data to support a backup application in performing a backup.

Referring now to the figures, FIG. 1 is a diagram of a system for supporting multiple backup applications using a single change tracker. A supporting system that includes a single change tracker interfaces with one or more backup applications and with one or more backup drivers. As will be described below, a multiple backup system receives, from a backup application, a request to associate with a backup map. The supporting system replicates the backup map to create a replica backup map associated with the backup application. The supporting system updates the replica backup map based on changes in the backup map.

As illustrated in FIG. 1, the system (100) includes a computing device (112). The computing device (112) stores an original data set. The computing device (112) may store the data on a storage device such as a hard disk drive or flash memory. As will be described below, the supporting system (110) supports a backup of the original data set from the computing device (112). The supporting system (110) comprises a single change tracker (111).

The system (100) further includes a number of backup applications (102). The backup applications (102) may reside on a computer device that is used to communicate, over a network, with the supporting system (110), to back up the original data set on the computing device (112). The backup applications (102) may reside on the same computer as the supporting system (110) or may reside on other networked machines. As will be described in other parts of this specification, a backup application requests, via the supporting system (110) to back up the original data set on the computing device (112).

As illustrated in FIG. 1, the system (100) includes the supporting system (110). The supporting system (110) receives, from a backup application (102), a request for support in performing a backup operation for the original data set on the computing device (112). The request received by the supporting system (110) may indicate all or a portion of the original data set stored on the computing device (112) that is to be backed up. Further, the request may identify the backup application (102). The request may configure the supporting system (110) to support the backup application (102) by including information specifying the data in the original data set stored on the computing device (112) that the backup application (102) will back up. The request may configure the supporting system (110) by providing interface information for the backup application (102). The supporting system (110) may receive a number of requests from a number of different backup applications (102-1, 102-2).

The request from the backup application to the supporting system includes an association between the requesting backup application and a backup map. The backup map indicates the portion of data in the original data set stored on the computing device (112) that is to be backed up. Further, the backup map may indicate data in the original data set that has changed since the prior backup and therefore is to be backed up. The backup map may indicate data that has changed since a backup application (102) last performed a backup.

The supporting system (110) creates a replica backup map for the backup application (102) that requested to be associated with the backup map, and associates the replica backup map with the backup application (102). The supporting system (110) updates the replica backup map based on changes in the backup map. Processes on the computing device (112) may continue to run and cause changes in the data in the original data set on the computing device (112). The change of data in the original data set on the computing device (112) may be data that the backup application (102) needs to back up. As a result, the supporting system (110) updates the replica backup map with the changes in data in the original data set reflected in the backup map. The backup application (102) may change the replica backup map during a backup or change the backup map to indicate that the data on the computing device (112) has been backed up, thus marking data for the backup application (102) to back up. Changes in the original data set are represented by changes in the backup map. As a result, the supporting system (110) updates the replica backup map with the changes in the backup map.

The backup applications (102), supporting system (110), and computing device (112) may reside on separate computers. The backup applications (102), supporting system (110) and computing device (112) may communicate over a network. The backup applications (102), the supporting system (110), and the computing device (112) may be integrated into a single device. The supporting system (110) may be integrated with the computing device (112). The supporting system (110) may be integrated with a number of backup applications (102).

Figure 2:
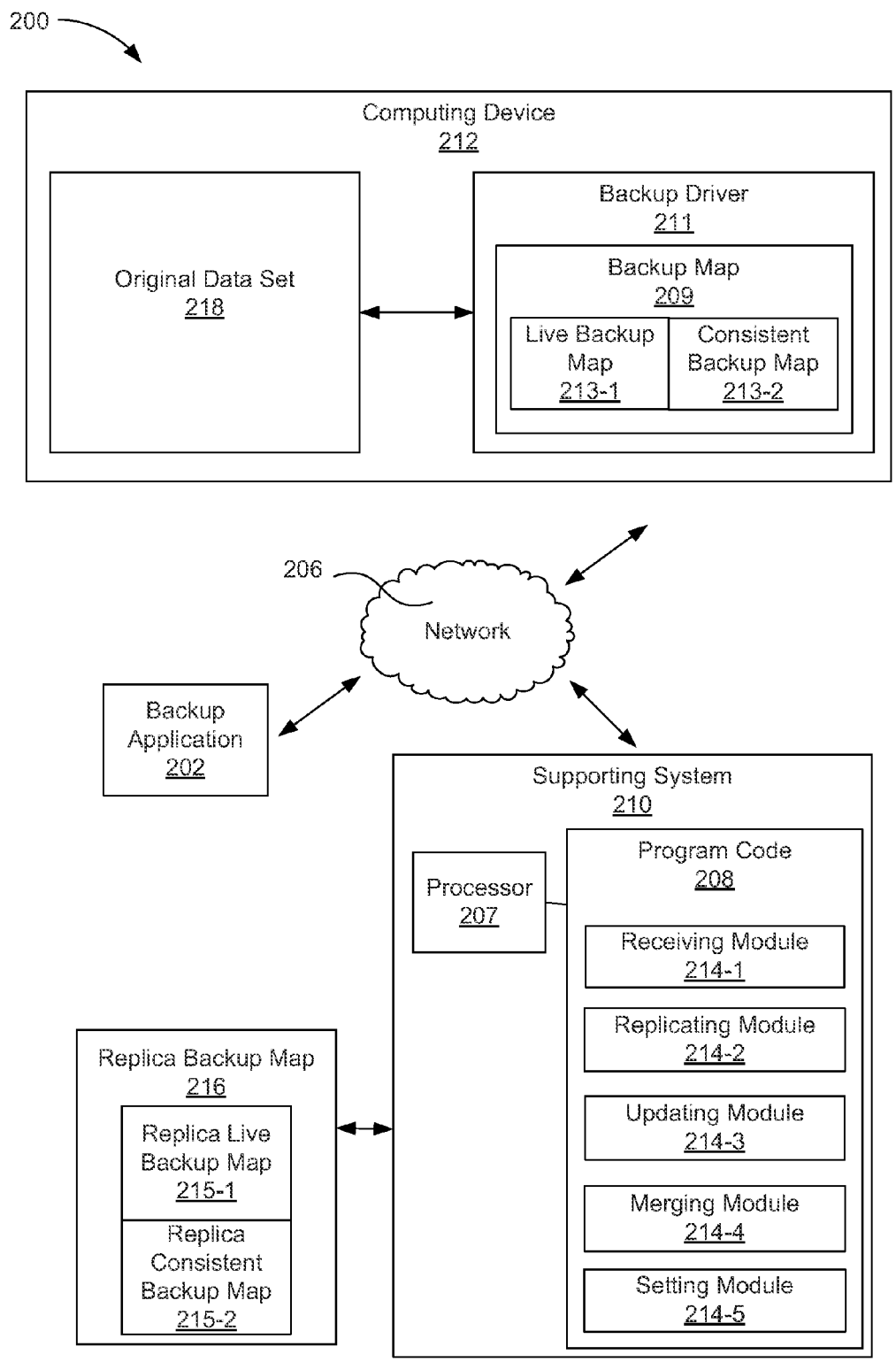
FIG. 2 illustrates a diagram of a system for supporting multiple backup applications using a single change tracker, according to one example of the principles described herein.

FIG. 2 is a diagram of a system for supporting multiple backup applications using a single change tracker. As will be described below, a supporting system is in communication with a computing device to back up data on the computing device. The supporting system receives, from a backup application, a request to associate with a backup map. The backup map may include a live backup map and a consistent backup map. The supporting system replicates the backup map to create a replica backup map. The replica backup map may include a replica live backup map and a replica consistent backup map. The supporting system updates the replica backup map based on changes in the backup map. The supporting system may merge the live backup map and the consistent backup map with the replica live backup map. The supporting system (210) may set the backup map to indicate data to be backed up or data that has been backed up. The supporting system (210) may then set the replica backup map to indicate data that has been backed up.

As illustrated in FIG. 2, the system (200) includes a computing device (212). The computing device (212) may be a data storage server, an email server, or another system that has data associated with it. The computer device (212) stores an original data set (218) that may be backed up by a backup application (202) using a supporting system (210). As illustrated, the computing device (212) includes a backup driver (211). The backup driver (211) is used to facilitate the backup of data in the original data set (218) on the computing device (212). Further, the backup driver (211) may include a backup map (209). As illustrated, the backup map (209) includes a live backup map (213-1) and a consistent backup map (213-2).

The live backup map (213-1) may include information that indicates which portions of data in an original data set (218) on a computing device (212) are to be backed up. The live backup map (213-1) may be set to indicate that data in the original data set (218) is to be backed up when data in the original data set (218) is changed. The consistent backup map (213-2) may include information that indicates data in the original data set (218) on a computing device (212) is being backed up by a backup application (202).

As illustrated, the system (200) includes a supporting system (210). The supporting system (210) includes a processor (207) and computer program code (208). The computer program code (208) includes a number of modules (214). The modules (214) refer to a combination of hardware and program instructions that cause the processor (207) to perform a designated function. As illustrated, the supporting system (210) includes a receiving module (214-1), a replicating module (214-2), an updating module (214-3), a merging module (214-4), and a setting module (214-5). As will be described below, the supporting system (210) may create a replica live backup map (215-1) and a replica consistent backup map (215-2).

The backup map (209) includes a live backup map (213-1) and a consistent backup map (213-2). The live backup map (213-1) maps the data in the original data set (218) stored on the computing device (212) that has changed since the live backup map (213-1) was merged with the consistent backup map (213-2). The consistent backup map (213-2) maps the data in the original data set (218) stored on the computing device (212) that is to be backed up by a backup application (202). The backup application (202) may back up changes to the data in the original data set (218) on the computing device (212) that are recorded in the consistent backup map (213-2), as well as changes in the live backup map (213-1).

The live backup map (213-1) may be represented as a live backup bitmap. The live backup bitmap maps to data in the original data set (218) stored on the computing device (212) that have changed since the last obtaining of a live backup bitmap. The consistent backup map (213-2) may be represented as a consistent backup bitmap. The consistent backup bitmap maps the data in the original data set (218) stored on the computing device (212) that is to be backed up by a backup application (202).

As illustrated, the supporting system (210) includes the receiving module (214-1). The receiving module (214-1) receives, from a backup application (202), a request to associate with a backup map (209). The request may include information sent to the supporting system (210) indicating that the backup application (202) is to be associated with the backup map (209). The receiving module (214-1) may receive the request from a backup application (202) through a network (206). Further, the receiving module (214-1) may receive the request as inter-process communication. Further, the receiving engine (214-1) may receive from a number of different backup applications (202), a number of requests to associate each of the number of different backup applications (202) with the backup map (209).

As illustrated, the supporting system (210) includes the replicating module (214-2). The replicating module (214-2) replicates the backup map (209) to create a replica backup map (216). The backup map (209) includes a live backup map (213-1) and a consistent backup map (213-2). The replica backup map (216) includes a replica live backup map (215-1) and a replica consistent backup map (215-2). The replicating module (214-2) allocates memory in the supporting system (210) and merges the live backup map (213-1) and the consistent backup map (213-2) into the replica live backup map (215-1) and the replica consistent backup map (215-2), respectively. The replicating module (214-2) may combine values in the live backup map (213-1) and the consistent backup map (213-2) and assign the combination to the replica live backup map (215-1). The supporting system (210) may provide functions to operate on the replica live backup map (215-1) and the replica consistent backup map (215-2), allowing the backup application to perform operations similar to those performed on the live backup map (213-1) and the consistent backup map (213-2). Further, the replicating module (214-2) may create a replica live backup map (215-1) and a replica consistent backup map (215-2) associated with each of a number of different backup applications (202).

As mentioned above, the supporting system (210) includes the updating engine (214-3). The updating engine (214-3) updates the replica live backup map (215-1) based on changes made to the live backup map (213-1) and the consistent backup map (213-2). The updating may be performed as described in FIG. 1.

As illustrated, the supporting system (210) includes the merging module (214-4). The merging module (214-4) propagates changes in the backup map (209) to the replica backup map (216). The merging module (214-4) merges the live backup map (213-1) and the consistent backup map (213-2) with the replica live backup map (215-1).

Further, the supporting system (210) includes the setting module (214-5). The setting module (214-5) sets a map. The map may be a backup map (209), a live backup map (213-1), a consistent backup map (213-2), a replica backup map (216), a replica live backup map (215-1), a replica consistent backup map (215-2), or a combination thereof. A value or values may be given to the setting engine (214-6) to set the backup map (209). The values may indicate data in the original data set (218) on the computing device (212) that is to be backed up. Further, the values may indicate a data in the original data set (218) on the computing device (212) has been backed up. The setting module (214-5) may set the backup map (208), or a portion of the backup map (208), based on the values. As will be described in other parts of this specification, a value of one in the backup map (208) may indicate that corresponding data in the original data set (218) on the computing device (212) may be backed up. A value of zero in the backup map (208) indicates that the corresponding data in the original data set (218) on the computing device (212) may be omitted from the backup. As a result, the setting module (214-5) allows the supporting system (210) to indicate that data in the original data set (218) on the computing device (212) is to be backed up, or that data in the original data set (218) is not to be backed up.

FIG. 2 will now be described. The backup application (202) initiates a request for a backup via the supporting system (210). The receiving module (214-1) receives the request to associate the backup application (202) with a backup map (209). The replicating module (214-2) of the supporting system (210) replicates the backup map (209) to create a replica backup map (216). The backup map (209) consists of a live backup map (213-1) and a consistent backup map (213-2). As changes to the data in the original data set (218) occur on the computing device (212), changes are made to the live backup map (213-1). The computing device (212) merges, via the supporting system (210), the live backup map (213-1) with the consistent backup map (213-2) in the backup map (209), and sets the live backup map (213-1) to indicate that the data in the original data set (218) is or has been backed up by a backup application (202). The updating module (214-3) updates the replica live backup map with changes made to the live backup map (213-1) and the replica live backup map (213-2). The updating module (214-3) may use the merging module (214-4) to merge the live backup map (213-1) into the replica live backup map (215-1). The backup application (202) may perform a backup, causing the supporting system (210) to update the replica live backup map (215-1) by merging the live backup map (213-1) and the consistent backup map (213-2), and causing the live backup map (213-1) to be marked as having the backup completed. A setting module (214-5) then sets the live backup map (213-1) to indicate that a backup of the data in the original data set (218) (212) has been performed. The backup application (202) may perform a backup causing the supporting system (210) to update the replica consistent backup map by merging the replica live backup state (215-1) with the replica consistent backup map (215-2). The setting module (214-5) may set the replica live backup map (215-1) to indicate that the backup application (202) is performing a backup.

Figure 3:
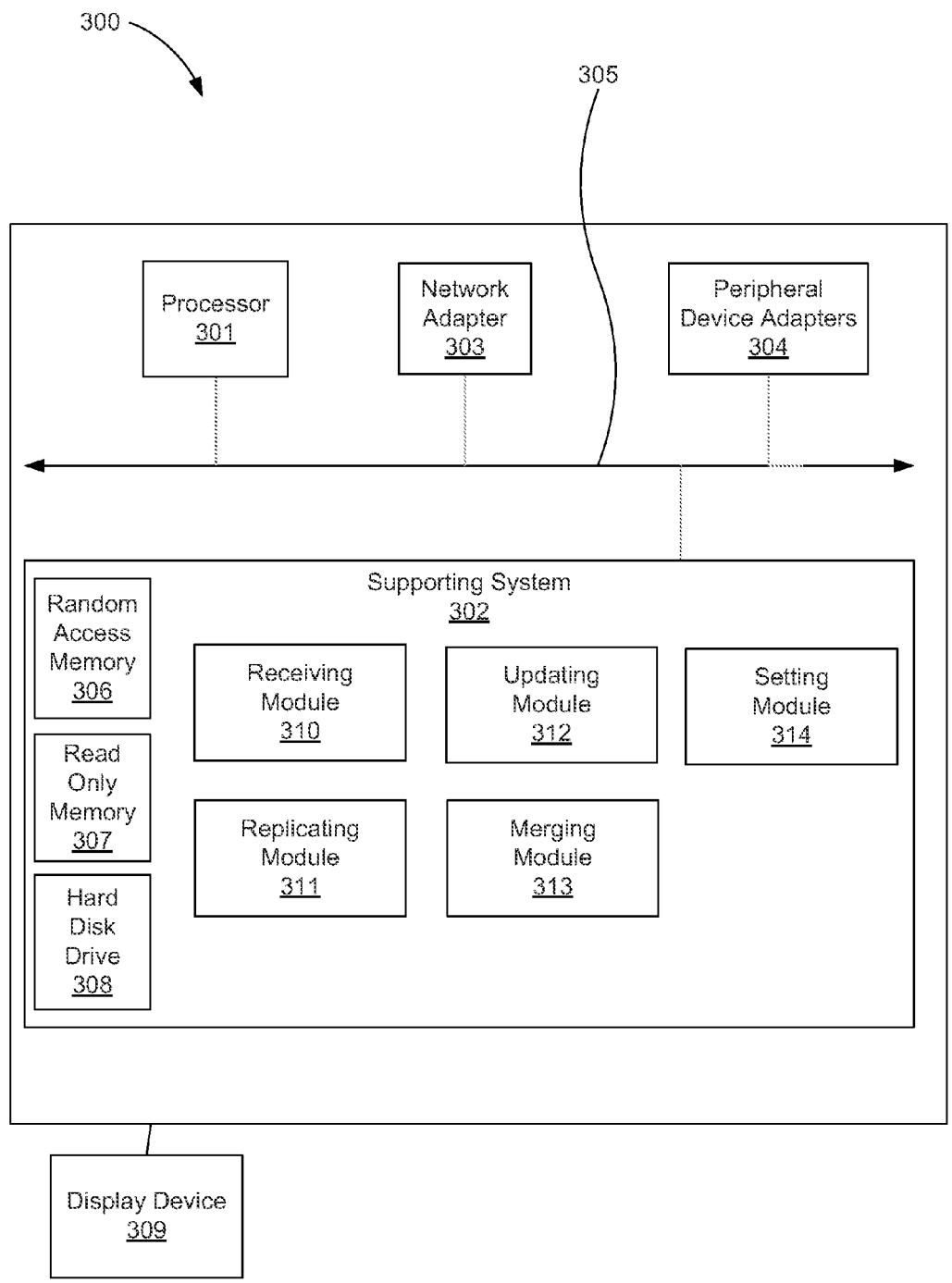
FIG. 3 illustrates a diagram of a computer program product for supporting multiple backup applications using a single change tracker, according to the principles described herein.

FIG. 3 represents a computing device for supporting multiple backup applications using a single change tracker, according to one example of the principles described herein. The computing device (300) for supporting multiple backup applications using a single change tracker may be implemented in an electronic device. Examples of electronic devices include servers, desktop computers, laptop computers, personal digital assistants (PDAs), mobile devices, smartphones, gaming systems, and tablets, among other electronic devices.

The computing device (300) may be utilized in any data-processing scenario, including stand-alone hardware, mobile applications, a computing network, or combinations thereof. Further, the computing device (300) may be used in a computing network, a public cloud network, a private cloud network, a hybrid cloud network, other forms of networks, or combinations thereof. In one example, the methods provided by the computing device (300) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; an application program interface (API), or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (300) are executed by a local administrator.

To achieve its desired functionality, the computing device (300) may include various hardware components. Among these hardware components may be a number of processors (301), a supporting system (302), a number of peripheral adapters (304), and a number of network adapters (303). These hardware components may be interconnected through the use of a number of buses and/or network connections. In one example, the processor (301), supporting system (302), peripheral device adapters (304), and network adapter (303) may be communicatively coupled via a bus (305).

The computing device (300) may include various types of memory modules, including volatile and nonvolatile memory. For example, the displaying system (302) may include Random Access Memory (RAM) (306), Read Only Memory (ROM) (307), and Hard Disk Drive (HDD) memory (308). Many other types of memory may also be utilized, and the present specification contemplates the use of as many varying type(s) of memory in the computing device (300) as may suit a particular application of the principles described herein. In other examples, different types of memory in the computing device (300) may be used for different data storage needs. In some examples, the processor (301) may boot from Read Only Memory (ROM) (307), maintain nonvolatile storage in the Hard Disk Drive (HDD) memory (308), and execute program code stored in Random Access Memory (RAM) (306).

Generally, the computing device (300) may comprise a computer readable medium, a computer readable storage medium, or a non-transitory computer readable medium, among others. For example, the computing device (300) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The hardware adapters (303, 304) in the computing device (300) enable the processor (301) to interface with various other hardware elements, external and internal to the computing device (300). The peripheral device adapters (304) may provide an interface to input/output devices, such as a display device (309), a mouse, or a keyboard. The peripheral device adapters (303) may also provide access to other external devices, such as an external storage device, a number of network devices, such as servers, switches, and routers, client devices, other types of computing devices, or combinations thereof.

The display device (309) may be provided to allow a user of the computing device (300) to interact with and implement the functionality of the computing device (300). The peripheral device adapters (304) may also create an interface between the processor (301) and the display device (309), a printer, or other media output devices. The network adapter (303) may provide an interface to other computing devices within, for example, a network, thereby enabling the transmission of data between the computing device (300) and other devices located within the network.

The supporting system (302) may include a number of engines used in the implementation of the support for multiple backup applications using a single change tracker. The various engines within the computing device (300) comprise executable program code that may be executed separately. The various engines may be stored as separate computer program products. The various modules within the computing device (300) may be combined within a number of computer program products; each computer program product comprising a number of the engines.

The computing device (300) includes a receiving module (310) to receive, from a backup application, a request to associate with a backup map. The backup map may include a live backup map and a consistent backup map. A replicating module (311) replicates the backup map to create a replica backup map. The replica backup map may include a replica live backup map and a replica consistent backup map. An updating module (312) updates the replica backup map based on changes to the backup map. A merging module (313) merges the live backup map and the consistent backup map with the replica live backup map. A setting module (314) sets the replica live backup map to indicate that the replica consistent backup map has been updated.

The receiving module (310) receives, from a backup application, a request to associate with a backup map. The receiving module (310) may receive from a number of different backup applications, a number of requests to associate each of the number of different backup applications with a backup map.

The replicating module (311) replicates the backup map to create a replica backup map. The backup map may include a live backup map and a consistent backup map. The replica backup map includes a replica live backup map and a replica consistent backup map. The replicating module (311) may create a replica backup map for each of the number of different backup applications. The supporting system (302) may then operate on each of the number of replica backup maps on behalf of each of the number of different backup applications.

The updating module (312) updates the replica backup map based on changes to the backup map. The updating module (312) may update the replica live backup map by invoking the merging module (313). The updating module (312) may read the consistent backup map and the live backup map, causing both the consistent backup map and the live backup map to be set to indicate that the backup has been performed. The updating module (312) may use a merging module (313) to store the values obtained by merging in each of the live backup map, the consistent backup map, and the replica live backup map. When a backup application performs a backup, the updating module (312) may use the merging module (313) to merge a change from the live backup map associated with the backup application into the replica live backup map associated with the backup application. The updating module (312) may set the backup map to indicate that the backup has been performed. Further, the updating module (312) may use a setting module (314) to set a backup map to indicate that the backup has been performed.

The setting module (314) sets a map. The map may include a backup map, a live backup map, a consistent backup map, a replica backup map, a replica live backup map, a replica consistent backup map, or combination thereof. The setting module (314) may set the live backup map and the consistent backup map and to indicate that the replica consistent backup map has been updated. The replica live backup map may be represented as a bitmap. The bitmap may indicate blocks in a file system to be backed up. The setting module (314) may set a bit associated with a block of data on a computing device to indicate the block of data is to be backed up. When the updating module (312) updates a bit in the replica consistent backup map with the value of the bit in the replica live backup map, the replica live backup map may set a bit to indicate that a backup application is performing a backup.

Aspects of the present system and method are described herein with reference to flowchart illustrations and/or block diagrams of methods, apparatus (systems) and computer program products, according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (301) of the computing device (300) or other programmable data processing apparatus, implements the functions or acts specified in the flowchart and/or block diagram block or blocks.

The computer usable program code may be embodied within a computer readable storage medium; the computer readable storage medium being part of the computer program product. The computer readable storage medium may be a non-transitory computer readable medium.

Figure 4:
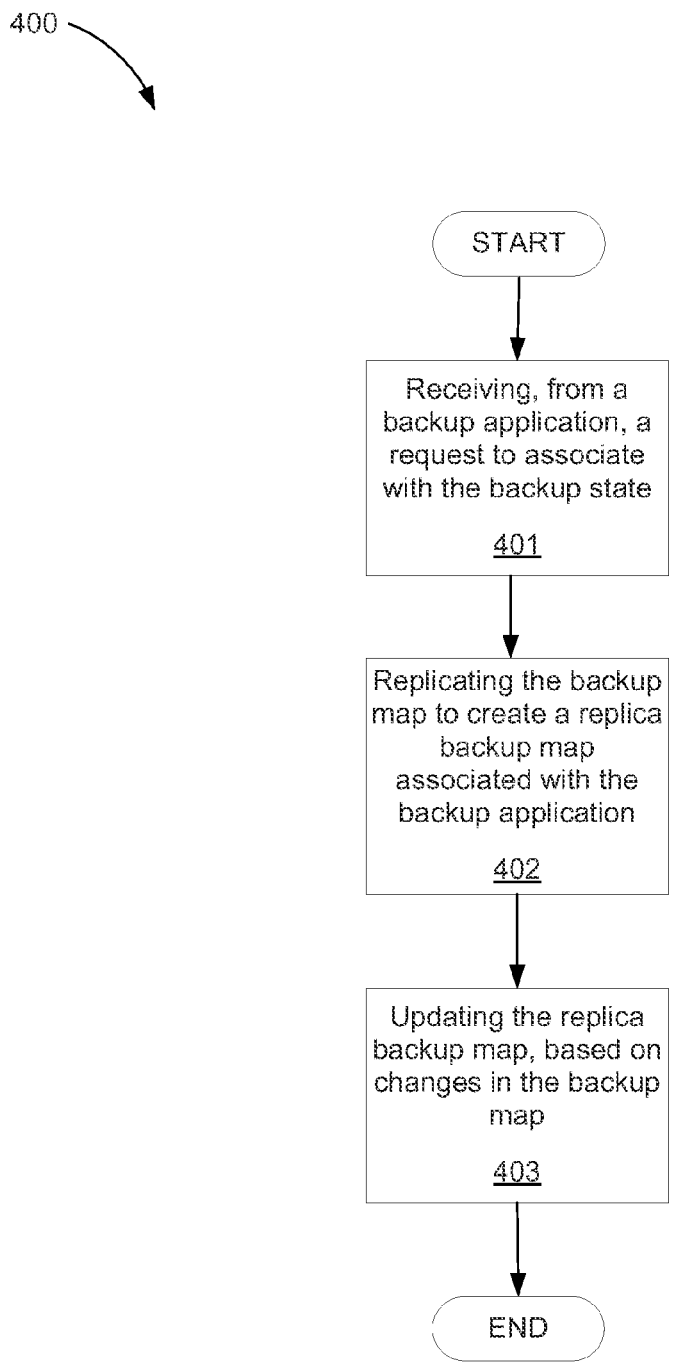
FIG. 4 illustrates a flowchart of a method implemented by a backup server for supporting multiple backup applications using a single change tracker, according to one example of principles described herein.

FIG. 4 is a flowchart of a method for supporting multiple backup applications using a single change tracker, according to one example of principles described herein. The method (400) may be executed by the supporting system of FIG. 1. The method (400) may be executed by other systems (i.e. system 200, system 300, and system 1700). As illustrated, the method (400) includes receiving (401), from a backup application, a request to associate with a backup map, replicating (402) the backup map to create replica backup map associated with the backup application, and updating (403) the replica backup map based on changes to the backup map.

As mentioned above, the method (400) includes receiving (401), from a backup application, a request to associate with a backup map. The request may be included as part of a registration process with the supporting system (FIG. 2, 210). A number of different requests to associate with a backup map may be received (401).

As mentioned above, the method (400) includes replicating (402) the backup map to create a replica backup map associated with the backup application. The replicating (402) may create a replica backup map for each of a number of different backup applications. The replica backup map tracks the backup of the data in the original data set on the computing device for the backup application. The replica backup map may include a replica live bitmap and a replica consistent bitmap.

Further, the method (400) includes updating (403) the replica backup map based on changes in the backup map. The updating (403) may be performed as described above.

Figure 5:
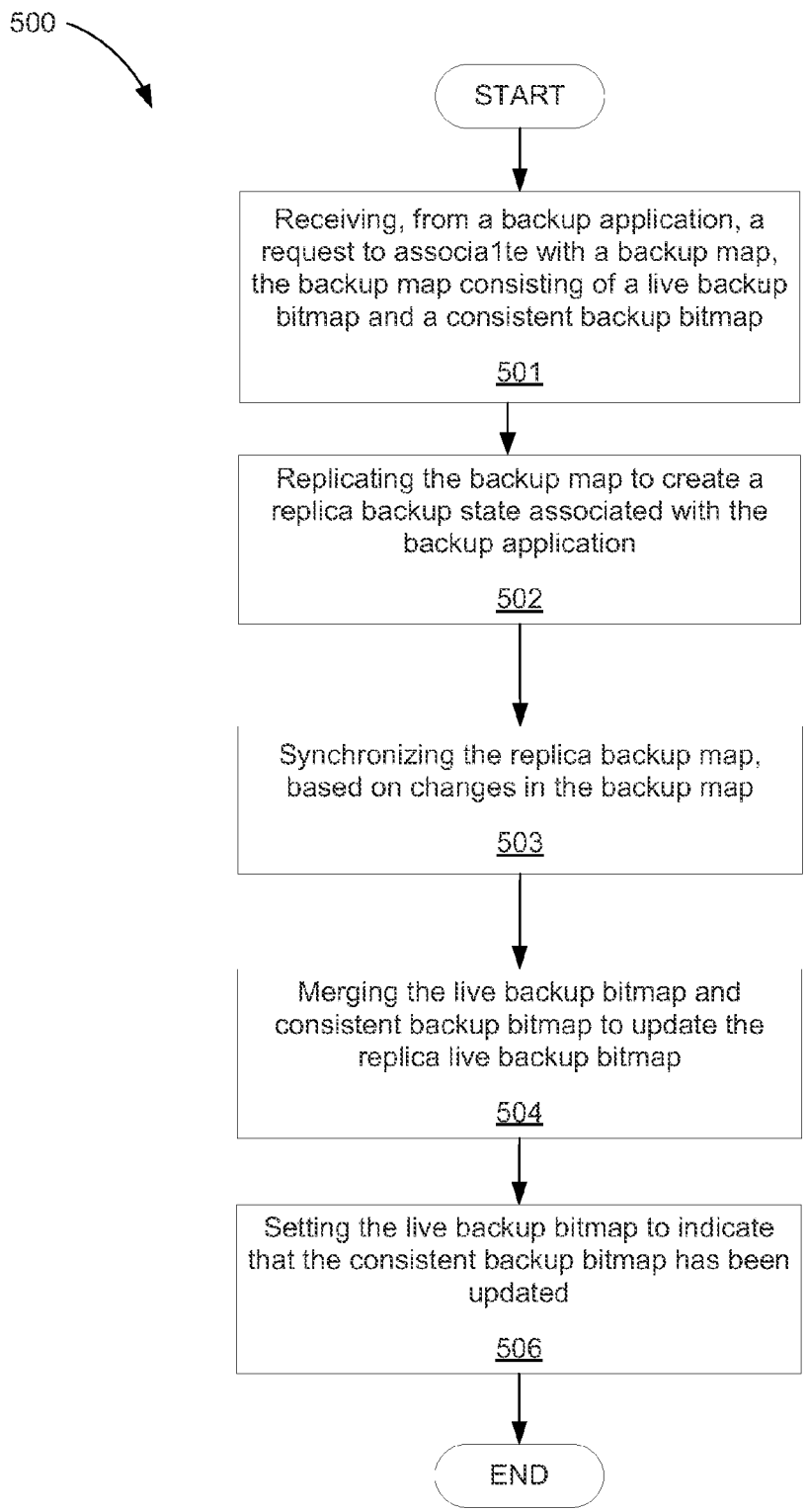
FIG. 5 illustrates a flowchart of a method implemented by a backup server for supporting multiple backup applications using a single change tracker, according to one example of principles described herein.

FIG. 5 is a flow chart of a method for supporting multiple backup applications using a single change tracker, according to one example of principles described herein. The method (500) may be executed by the support system of FIG. 1. The method (500) may be executed by other systems (i.e. system 200, system 300, and system 1700). As illustrated, the method (500) includes receiving (501), from a backup application, a request to associate with a backup map, the backup map comprising a live backup bitmap and a replica backup bitmap, replicating (502) the backup map to create a replica backup map associated with the backup application, the replica backup map includes a replica live backup bitmap and a replica consistent backup bitmap, synchronizing (503) the replica backup map based on changes in the backup map, merging (504) the live backup bitmap and the consistent bitmap with the replica live bitmap to update the replica live bitmap, and setting (506) a map, comprising setting the backup map, the live backup map, the consistent backup bitmap, the replica backup map, the replica live backup bitmap, the replica consistent backup bitmap, or combination thereof.

As mentioned above, the method (500) may include merging (504) the live backup bitmap and the consistent backup bitmap with the replica live backup bitmap to update the replica live backup bitmap. A bit may be set in the live backup bitmap, representing data in the original data set that is to be backed up. However, the bit may not be set in the consistent backup bitmap or the replica live backup bitmap. The bit in the live backup bitmap is merged with the corresponding bits in the consistent backup bitmap and the replica live backup bitmap. Due to one of the bits being set in the maps, the corresponding bit is set in the replica live backup bitmap. The replica live backup bitmap may be merged with the replica consistent backup bitmap to inform the backup application as to what data to back up.

As mentioned above, the method (500) may include setting (505) a map. The replica live bitmap may be set to indicate that the replica consistent bitmap has been updated. When the replica consistent bitmap is updated with the values of the replica live bitmap, the method (500) may set (505) a bit in the replica live backup bitmap to a value to indicate that the data has been backed up. Setting (505) a bit in the replica live backup bitmap to a value may indicate additional changes to data that may be backed up.

Figure 6:
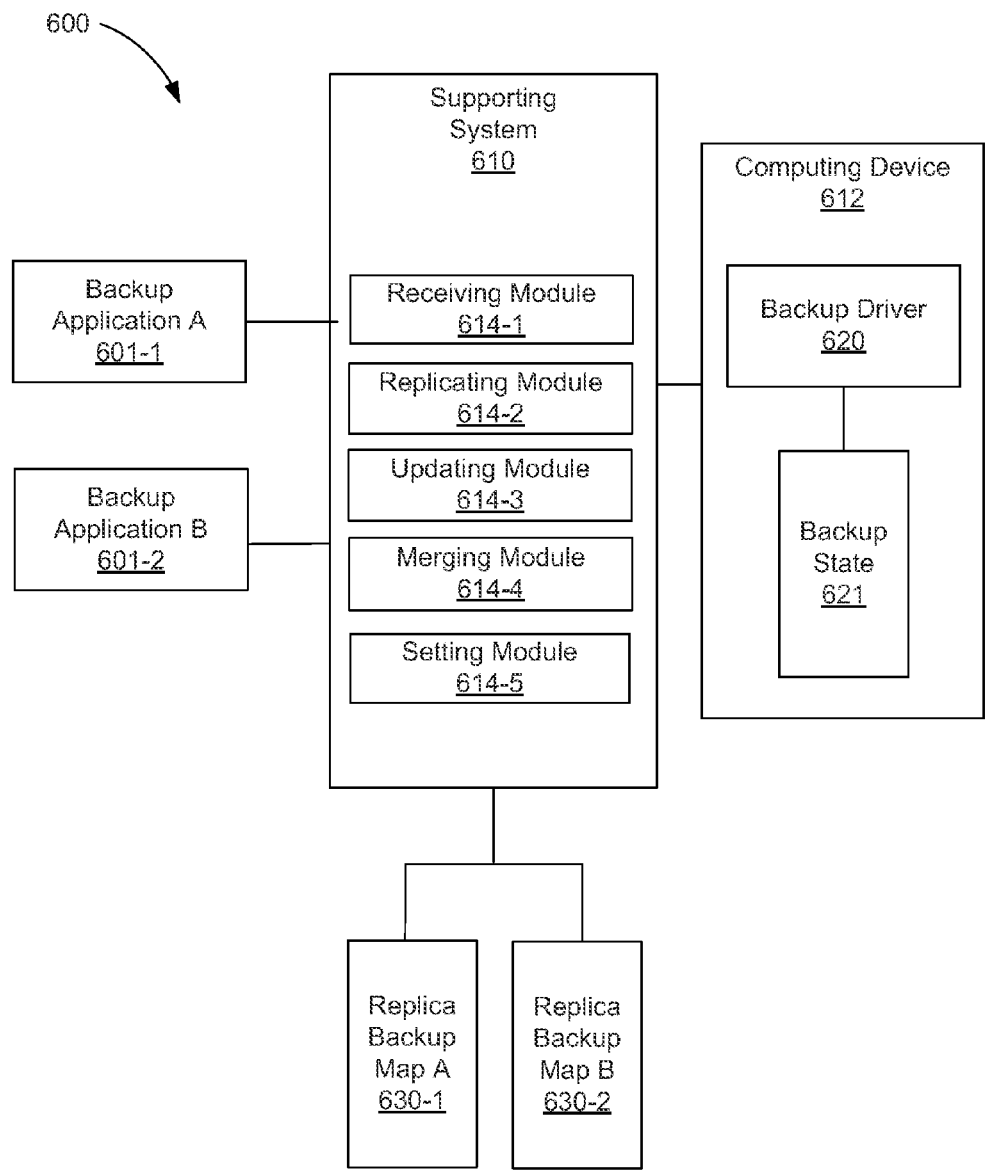
FIG. 6 illustrates a diagram of a backup system, according to one example of principles described herein.

FIG. 6 is a diagram of a multiple backup system using a single change tracker supporting a number of backup applications, according to one example of the principles described herein. As will be described below, the supporting system receives, from a number of different backup applications, requests to associate with a backup map. The supporting system creates a number of replica backup maps for each of a number of different backup applications. Further, the supporting system updates the replica backup map based on changes in the backup map. Further, the supporting system updates the replica backup map based on changes in the backup map.

As illustrated, the system (600) includes a supporting system (610). The supporting system (610) may reside on the same computing device (612) as a backup driver (620). The supporting system (610) may reside on a different computing device (612) than the backup diver (620). Further, a number of different backup applications (601) may send a request to the supporting system (610) such that each of the number of different backup applications (601) is to be associated with the backup state (621) to create a number of replica backup maps (630). Each of the replica backup maps (630) is associated with each of the number of different backup applications (601). As illustrated, backup application A (601-1) is associated with replica backup map A (630-1) and backup application B (601-2) is associated with replica backup map B (630-2). The supporting system (610) updates the replica backup maps (630) based on changes in the backup state (621).

As mentioned above, the supporting system (610) includes a number of modules (614). The receiving module (614-1) of the supporting system (610) receives a request from backup application A (601-1) to associate with the backup map (621). Further, the receiving module (614-2) may receive a request from backup application B (601-2) to associate with the backup map (621).

The replicating module (614-2) replicates the backup map (621) to create replica backup maps (630) associated with the backup applications (601). The replicating module (614-2) creates a replica backup map A (630-1) and associates replica backup map A (630-1) with backup application A (601-1). Similarly, the replicating module (614-2) creates replica backup map B (630-2) and associates replica backup map B (630-2) with backup application B (601-2).

The updating module (614-3) updates the replica backup maps (630) based on changes in the backup map (621). The changes may be made as described above.

FIG. 7 through FIG. 16 illustrate diagrams of block level backup map changes, according to one example of principles described herein. As will be described below, a backup map (FIG. 6, 621) is represented in a binary bitmap format. Each bit in the bitmap representing a block of data in the original data set that is to be backed up. A block of data may be an area of storage in a file system on a computing device. A bit that is set to one may indicate that a corresponding block of data in the original data set stored on a computing device may be backed up. A bit that is set to zero indicates that the corresponding block of data in the original data set on the computing device may be omitted from the backup.

As illustrated in FIG. 7 through FIG. 16, the single change tracker (FIG. 7, 700, FIG. 8, 800, FIG. 9, 900, FIG. 10, 1000, FIG. 11, 1100, FIG. 12, 1200, FIG. 13, 1300, FIG. 14, 1400, FIG. 15, 1500, and FIG. 16, 600) includes a backup map (FIG. 6, 621, FIG. 7, 708, FIG. 8, 808, FIG. 9, 908, FIG. 10, 1008, FIG. 11, 1108, FIG. 12, 1208, FIG. 13, 1308, FIG. 14, 1408, FIG. 15, 1508, FIG. 16, 1608). The backup map is represented by a live backup bitmap (FIG. 7, 709, FIG. 8, 809, FIG. 9, 909, FIG. 10, 1009, FIG. 11, 1109, FIG. 12, 1209, FIG. 13, 1309, FIG. 14, 1409, FIG. 15, 1509, FIG. 16, 1609) and a consistent backup bitmap (FIG. 7, 719, FIG. 8, 819, FIG. 9, 919, FIG. 10, 1019, FIG. 11, 1119, FIG. 12, 1219, FIG. 13, 1319, FIG. 14, 1419, FIG. 15, 1519, FIG. 16, 1619). The live backup bitmap indicates blocks of data in the original data set stored on the computing device that may have changed since a previous backup was performed. The consistent backup bitmaps indicates blocks of data in the original data set on a computing device that are being backed up by a backup application. As mentioned above, a value of one in the bitmap indicates a block of data in the original data set stored on a computing device is to be backed up. A value of zero indicates a block of data in the original data set stored on a computing device may be omitted from a backup.

Further, the bitmap includes replica backup map A (FIG. 6, 630-1, FIG. 7, 728, FIG. 8, 828, FIG. 9, 928, FIG. 10, 1028, FIG. 11, 1128, FIG. 12, 1228, FIG. 13, 1328, FIG. 14, 1428, FIG. 15, 1528, FIG. 15, 1528, FIG. 16, 1628). Replica backup map A represents a backup map associated with backup application A (FIG. 6, 601-1). Further, replica backup map A is represented by a replica live backup bitmap A (FIG. 7, 729, FIG. 8, 829, FIG. 9, 929, FIG. 10, 1029, FIG. 11, 1129, FIG. 12, 1229, FIG. 13, 1329, FIG. 14, 1429, FIG. 15, 1529, FIG. 16, 1629) and a replica consistent backup bitmap A (FIG. 7, 739, FIG. 8, 839, FIG. 9, 939, FIG. 10, 1039, FIG. 11, 1139, FIG. 12, 1239, FIG. 13, 1339, FIG. 14, 1439, FIG. 15, 1539, FIG. 16, 1639). The replica live backup bitmap A indicates blocks of data in the original data set stored on the computing device that have changed since the previous backup was performed. The replica consistent backup bitmap A indicates blocks of data in the original data set stored on the computing device that are being backed up by backup application A (FIG. 601-1).

The bitmap further includes replica backup map B (FIG. 6, 630-2, FIG. 7, 748, FIG. 8, 848, FIG. 9, 948, FIG. 10, 1048, FIG. 11, 1148, FIG. 12, 1248, FIG. 13, 1348, FIG. 14, 1448, FIG. 15, 1548, FIG. 15, 1548, FIG. 16, 1648). Replica backup map B is represented by a replica live backup bitmap B (FIG. 7, 749, FIG. 8, 849, FIG. 9, 949, FIG. 10, 1049, FIG. 11, 1149, FIG. 12, 1249, FIG. 13, 1349, FIG. 14, 1449, FIG. 15, 1549, FIG. 16, 1649) and a replica consistent bitmap B (FIG. 7, 759, FIG. 8, 859, FIG. 9, 959, FIG. 10, 1059, FIG. 11, 1159, FIG. 12, 1259, FIG. 13, 1359, FIG. 14, 1459, FIG. 15, 1559, FIG. 16, 1659). The replica live backup bitmap B indicates blocks of data in the original data set stored on the computing device that have changed since the previous backup was performed. The replica consistent backup bitmap B indicates blocks of data in the original data set stored on the computing device that are being backed up by a backup application B.

Figure 7:
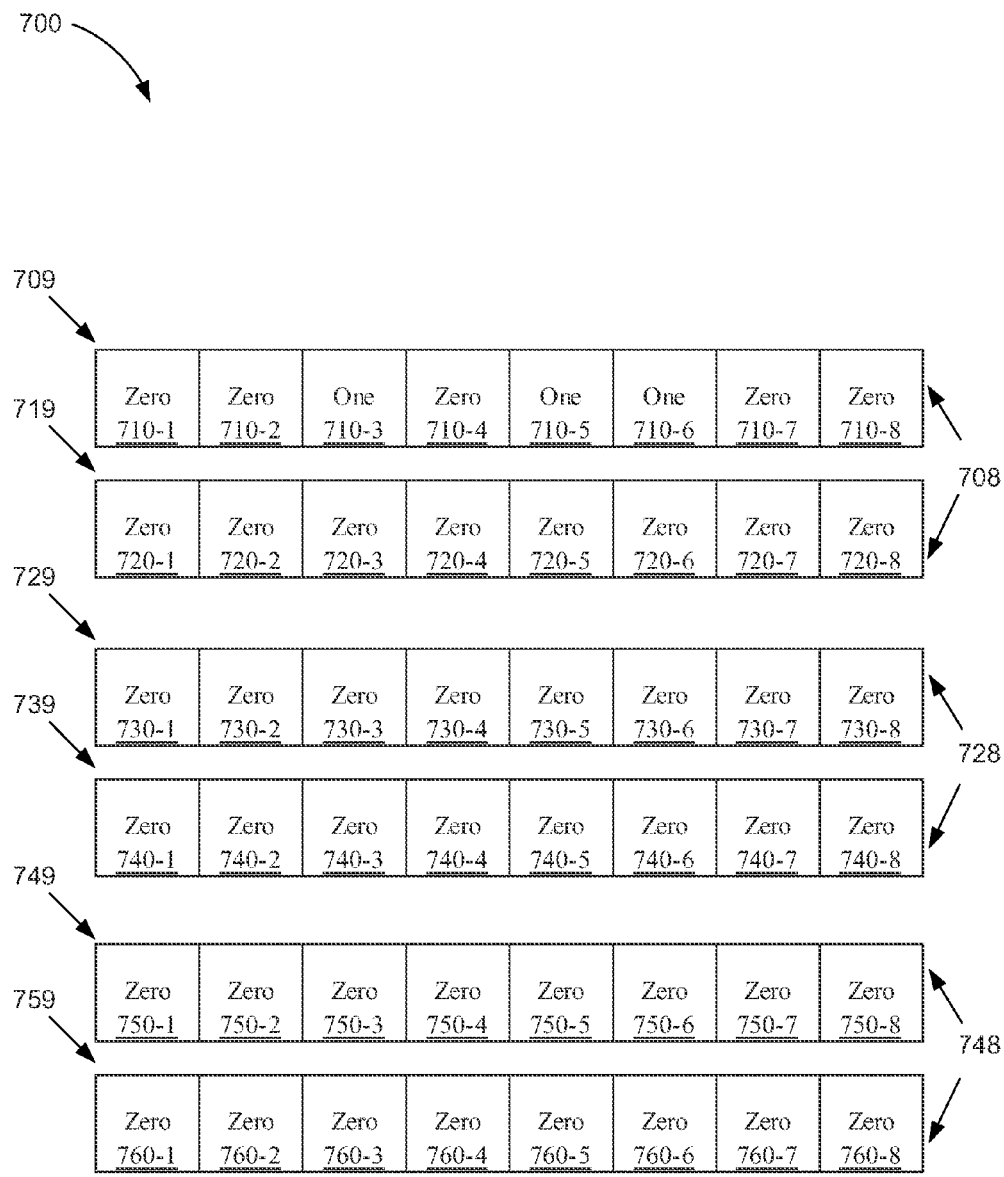
FIG. 7 through FIG. 16 illustrate diagrams of block level backup map changes, according to one example of principles described herein.

Turning specifically to FIG. 7. In FIG. 7, the supporting system (FIG. 6, 610) receives (FIG. 6, 614-1) a request from backup application A (FIG. 6, 601-1) and backup application B (FIG. 6, 601-2) to be associated with a backup map (708). The supporting system (FIG. 6, 610) replicates (FIG. 6, 614-2) the backup map (708) to create a replica backup map A (728) and associates the replica backup map A (728) with backup application A (FIG. 6, 601-1). The supporting system (FIG. 6, 610) replicates the backup map (708) to create a replica backup map B (728) and associates the replica backup map B (748) with backup application B (FIG. 6, 601-2).

A number of bits (710-3, 710-5, 710-6) in the live backup bitmap (709) are set to one, indicating the blocks of data in the original data set that are to be backed up. The consistent backup bitmap (719) has all bits (720) set to zero, indicating that no backup is to occur. Replica backup map A (728) and replica backup map B (748) have bits in the replica live backup bitmap (730, 750) set to zero, indicating that no backup is to occur. Replica backup map A (728) and replica backup map B (748) have bits in the replica consistent backup bitmap (740, 760) set to zero, indicating the backup applications (FIG. 6, 601) are not performing a backup.

Figure 8:
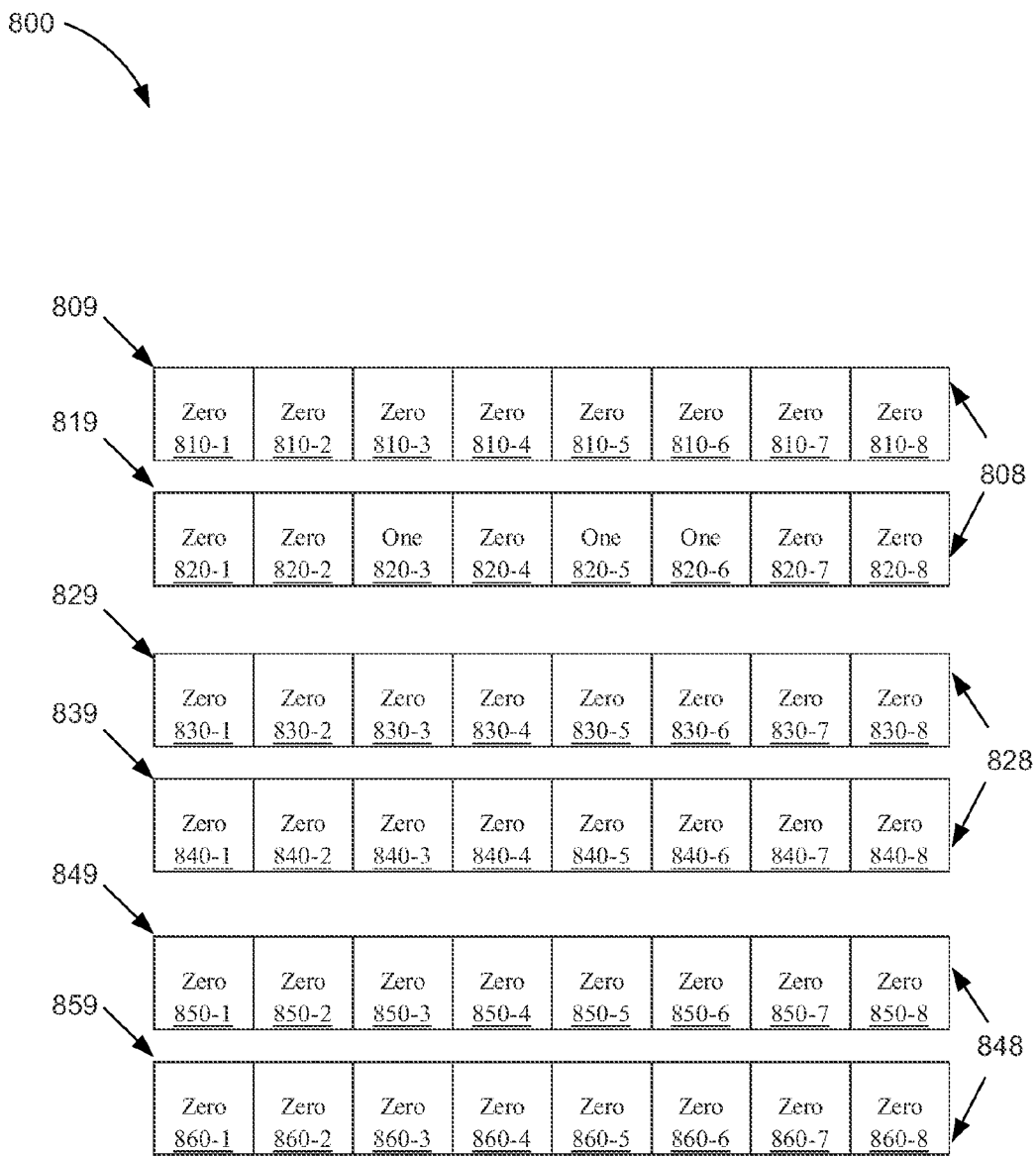

Turning specifically to FIG. 8. In FIG. 8, the supporting system (FIG. 6, 610) updates the data in the backup map (808) with the replica backup maps (828, 848). The supporting system causes the bits from the live backup bitmap (FIG. 7, 709, 809) to be merged into the consistent backup bitmap (FIG. 7, 719, 819). The bits (820-3, 820-5, 820-6) are set to indicate that the corresponding blocks of data in the original data set are in the process of being backed up. As illustrated, bits (820-1, 820-2, 820-4, 820-7, 820-8) are set to zero, indicating data associated with the blocks will not be backed up. The bits (810) in the live backup bitmap (809) are set to zero, indicating that all data in the original data set is either in process of being backed up or have been backed up. Replica backup map A (828) and replica backup map B (848) have bits (830, 840, 850, 860) set to zero to indicate that there is no backup being performed for backup application A (FIG. 6, 601-1) or backup application B (FIG. 6, 601-2).

Figure 9:
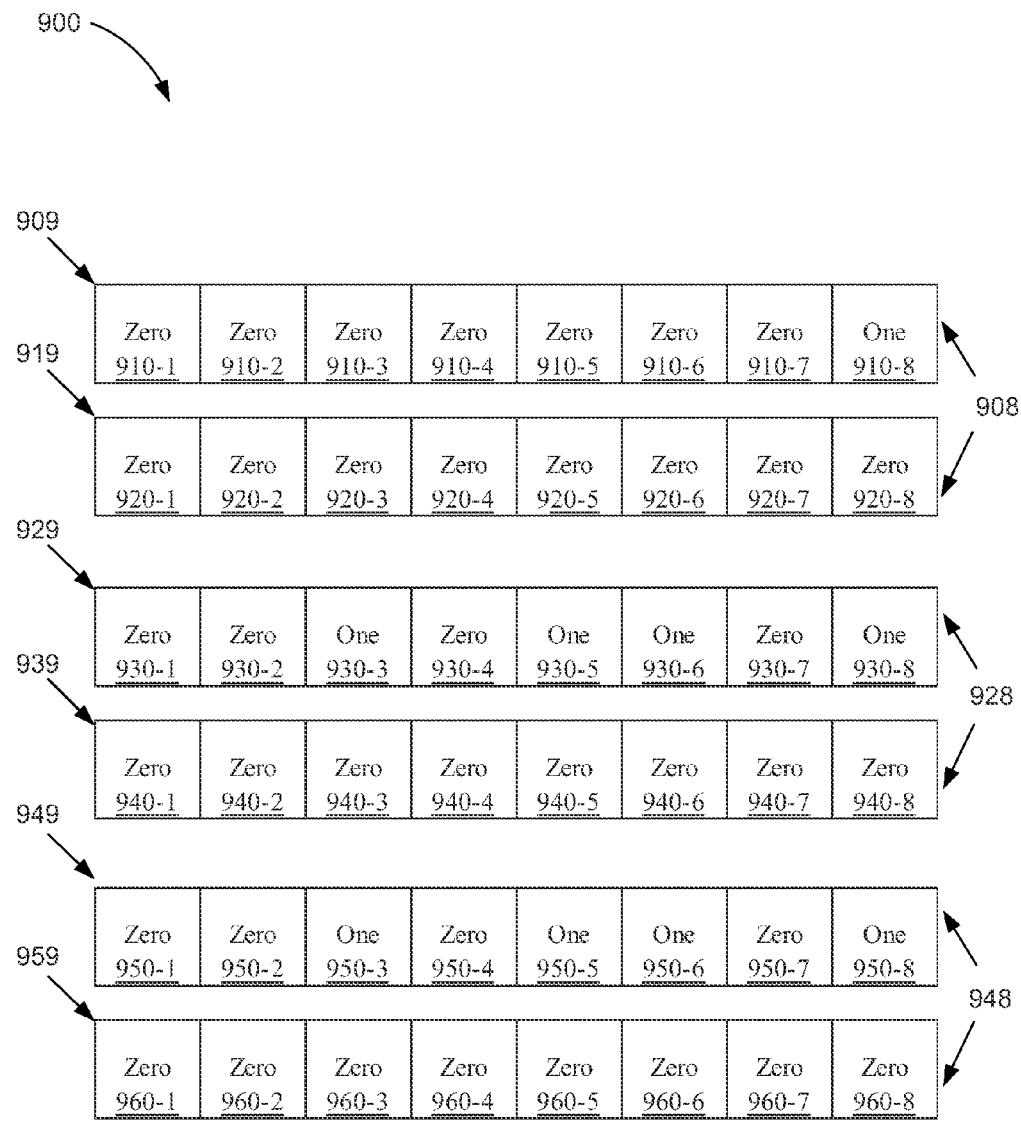

Turning specifically to FIG. 9. In FIG. 9, additional activity on the computing device (FIG. 2, 212) causes bit 910-8 to be set in the live backup bitmap (909) to one. The supporting system (FIG. 6, 610) merges the live backup bitmap (909) and the consistent backup bitmap (FIG. 8, 819) to set the replica live backup bitmap A (929) and the replica live backup bitmap B (949). The replica live backup bitmap A (929) depicts that bit 910-8 and bits 820-3, 820-5, and 820-6 from the consistent backup bitmap (FIG. 8, 819) are merged to set bits 930-3, 930-5, 930-6, and 930-8 in replica live backup bitmap A (929) to one. The replica live backup bitmap B (949) depicts that bit 910-8 and the bits 820-3, 820-5, and 820-6 from the consistent backup bitmap (FIG. 8, 819) are merged to set bits 950-3, 950-5, 950-6, and 950-8 in replica live backup bitmap A (929) to one. The consistent backup bitmap (919) has all bits (920) set to zero to indicate that the backup has occurred with respect to the data in the original data set represented by the backup map (908).

Figure 10:
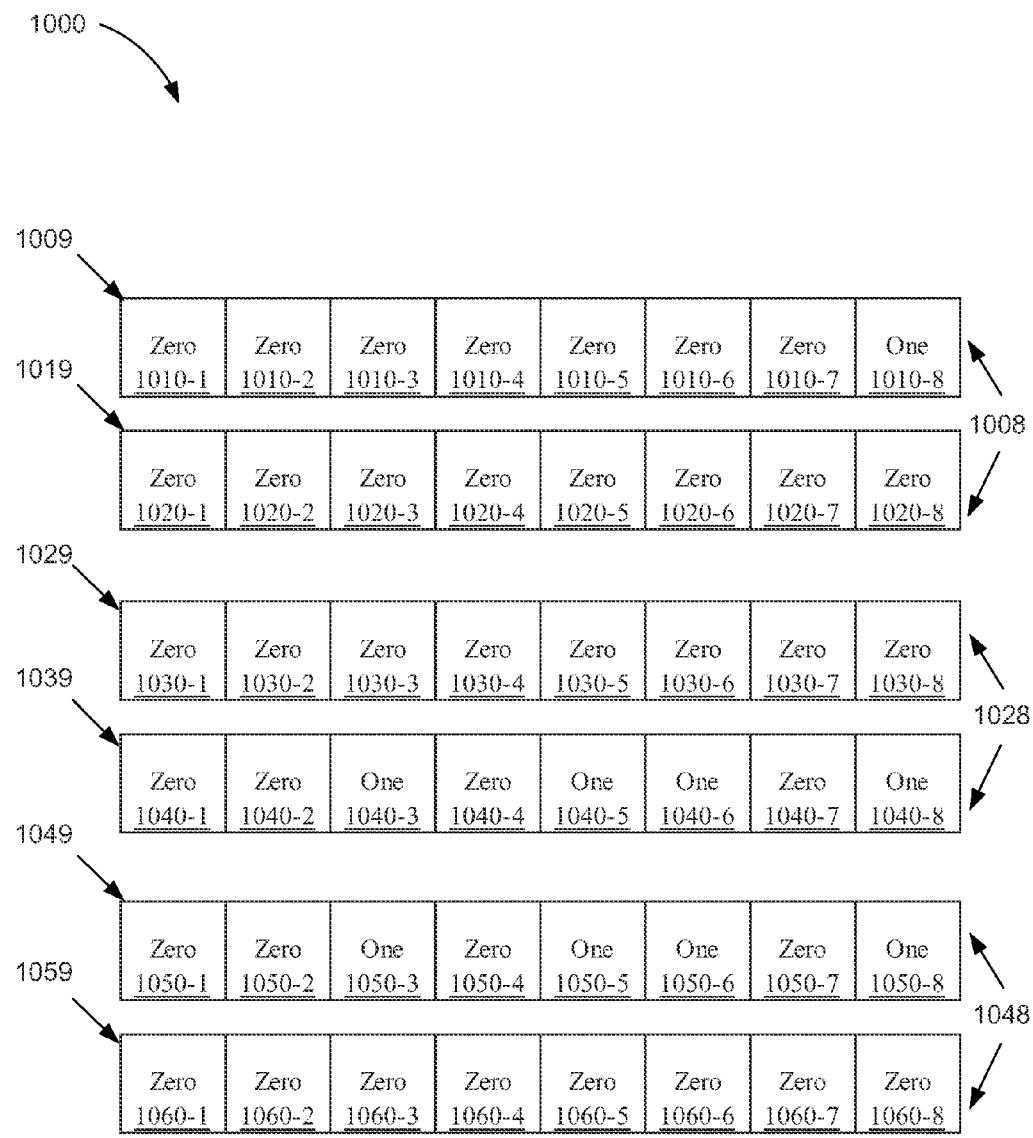

Turning specifically to FIG. 10. In FIG. 10, the live backup bitmap (1009) has bit 1010-8 set to one and bit 1010-8 remains set to one until it is propagated to the consistent backup bitmap (1019). Backup Application A (FIG. 6, 601-1) initiates a backup via a request that causes the multiple backup system (FIG. 6, 610) to move bits 930-3, 930-5, 930-6, 930-8 from the replica live backup bitmap A (FIG. 9, 929) to the replica consistent backup bitmap A (1039). As illustrated, replica consistent backup bitmap A (1039) now indicates that the blocks of data in the original data set corresponding to bits 1040-3, 1040-5, 1040-6, 1040-8 are to be backed up. Replica live backup bitmap A (1029) has all bits (1030) set to zero indicating there is no additional data in the original data set to backup. Backup application B (601-2) has not engaged in any activity. This leaves replica backup map B (1048) unchanged.

Figure 11:
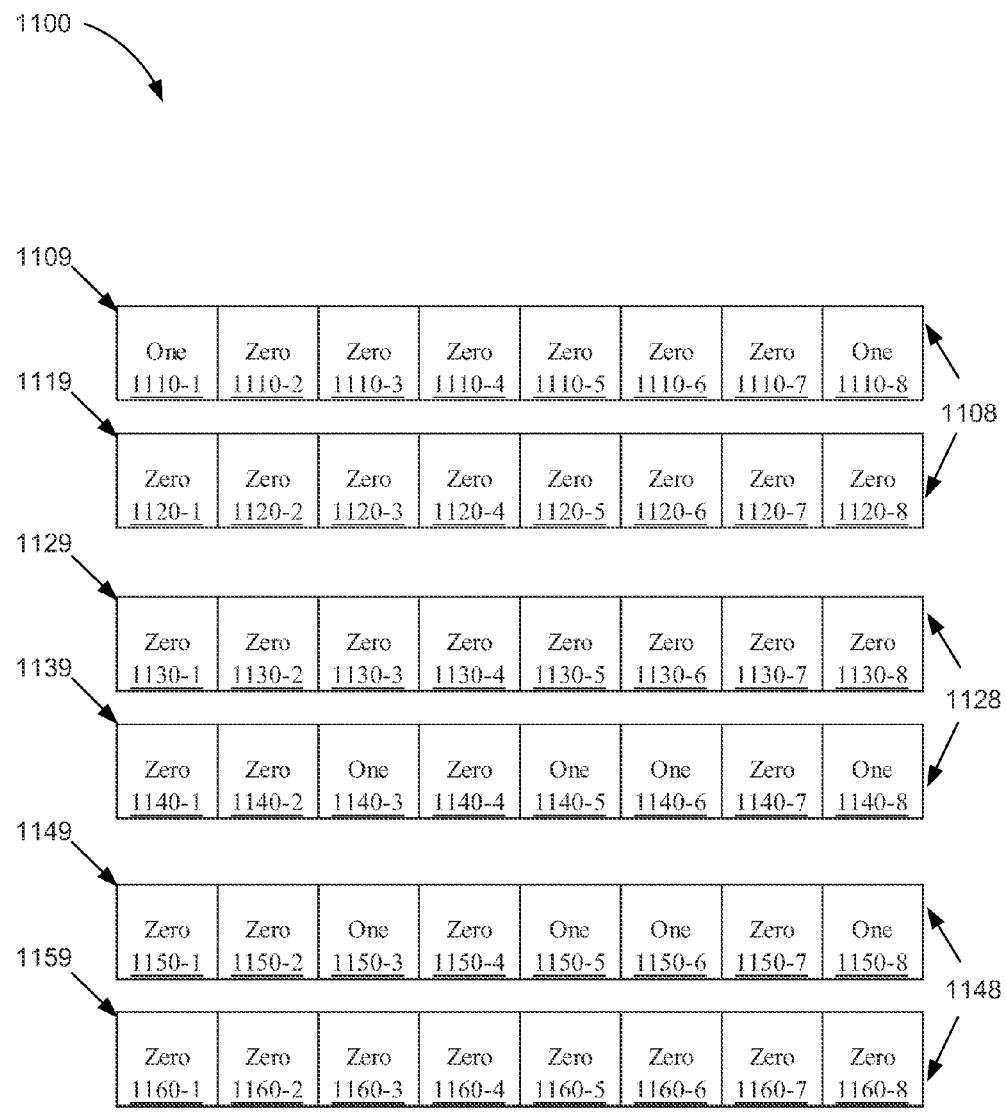

Turning specifically to FIG. 11. FIG. 11 shows that the computing device (FIG. 2, 212) continues to change the data in the original data set (FIG. 2, 218) stored on the computing device (FIG. 2, 212). The live backup bitmap (1109) now depicts bit 1110-1 has changed to one to indicate that an additional block of the data in the original data set is to be backed up. Bits 1110-8 and 910-8 continue to indicate that different blocks of data in the original data set are to be backed up.

Figure 12:
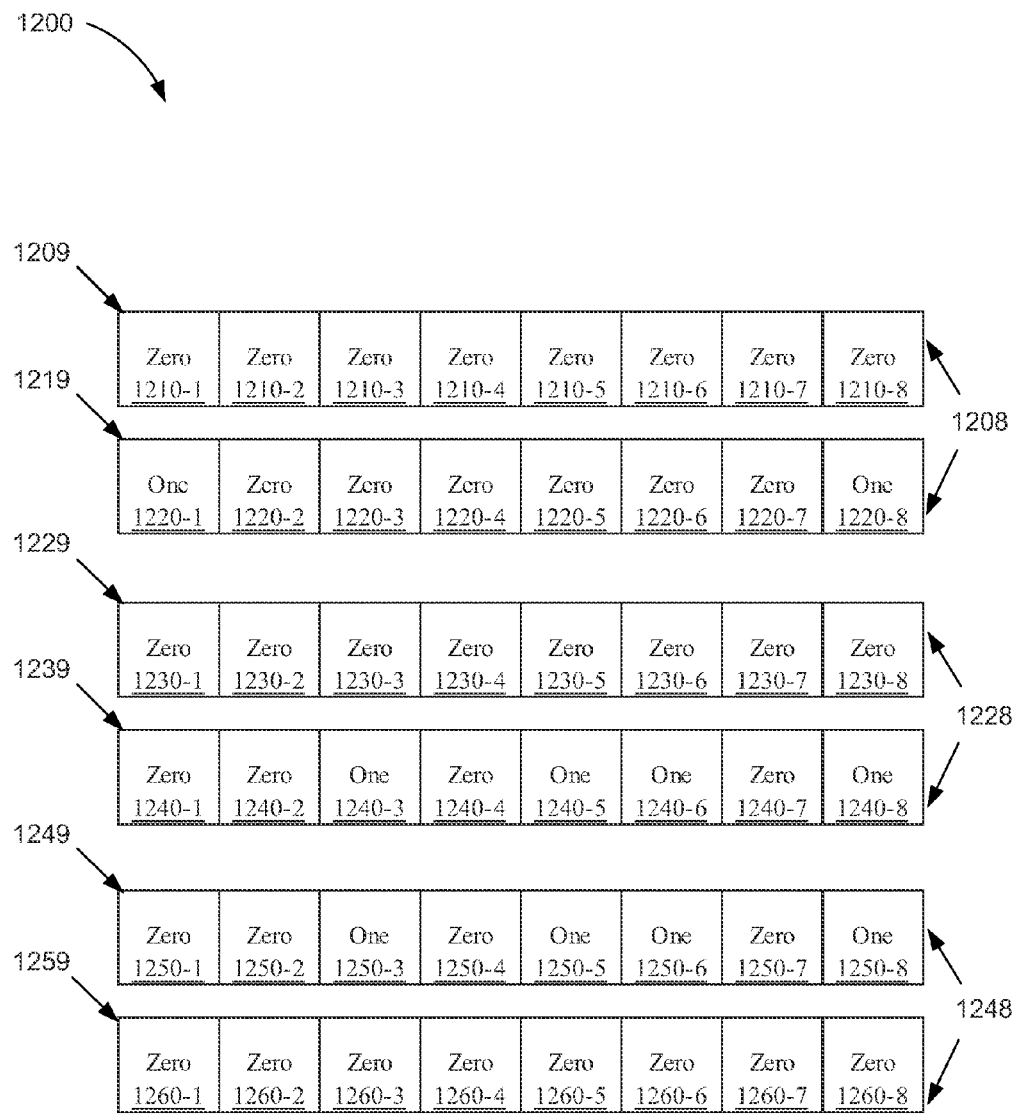

Turning specifically to FIG. 12. In FIG. 12, the supporting system (FIG. 6, 610) reads the backup map (1208) and causes the live backup bitmap (FIG. 11, 1109, 1209) to be propagated to the consistent backup bitmap (1219). The consistent backup bitmap (1219) now depicts bits 1220-1 and 1220-8 as set to one to indicate that a backup is in progress. The live backup bitmap (1209) depicts all bits (1210) as zero to indicate that a backup has or is being performed on the changes made to the data.

Figure 13:
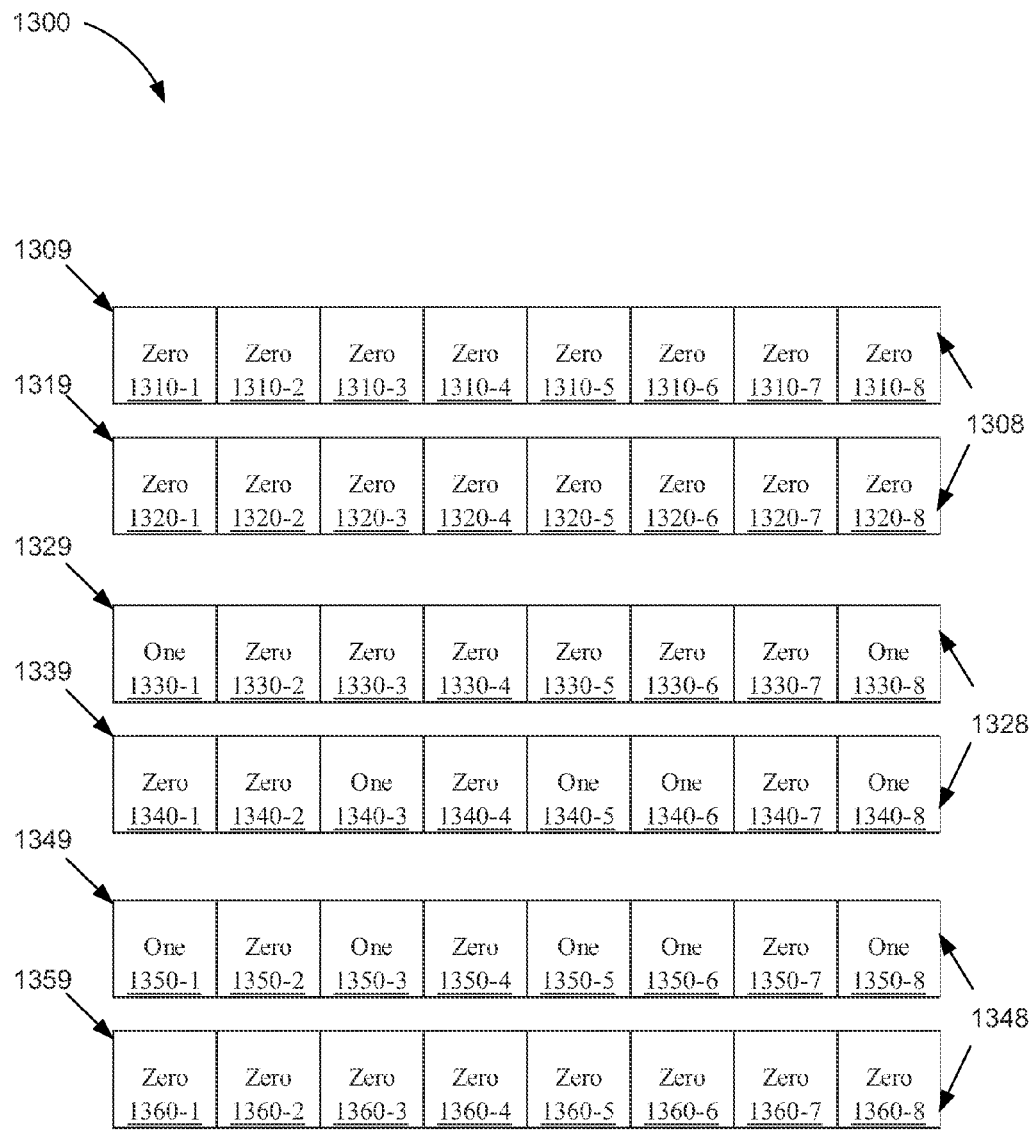

Turning specifically to FIG. 13. In FIG. 13, the supporting system (FIG. 6, 610) merges the live backup bitmap (FIG. 12, 1209, 1309) and the consistent backup bitmap (FIG. 12, 1219, 1319) with the replica live backup bitmaps (1329, 1349). The consistent backup bitmap (1319) is set so all bits (1320) are zero to indicate that a backup has been performed. Replica live backup bitmap A (1329) shows a first set of bits (1330-1, 1330-8) as marked for backup. The first set of bits (1330-1, 1330-8) represent blocks of data in the original data set that are to be backed up the next time backup application A (FIG. 6, 601-1) performs a backup. Backup application A (FIG. 601-1) continues to backup blocks indicated by bits in replica consistent backup bitmap A (1339).

Replica live backup bitmap B (1349) shows a second set of bits, such as bits 1350-1, 1350-3, 1350-5, 1350-6, and 1350-8 as marked for backup, each bit indicating a block of data in the original data set that is to be backed up. This second set of bits (1350-1, 1350-3, 1350-5, 1350-6, 1350-8) is marked to indicate that backup application B (FIG. 6, 601-2) is to back up the blocks of data in the original data set represented by the bits. Backup application B (FIG. 6, 601-2) is shown to have not initiated a backup, as demonstrated by replica consistent backup bitmap B (1459) being set to not backup data. The differences between replica backup bitmap A (1428) and replica backup bitmap B (1448) are the result of backup application A (FIG. 6, 601-1) starting to perform a backup and backup application B (FIG. 6, 601-2) not starting to perform a backup.

Figure 14:
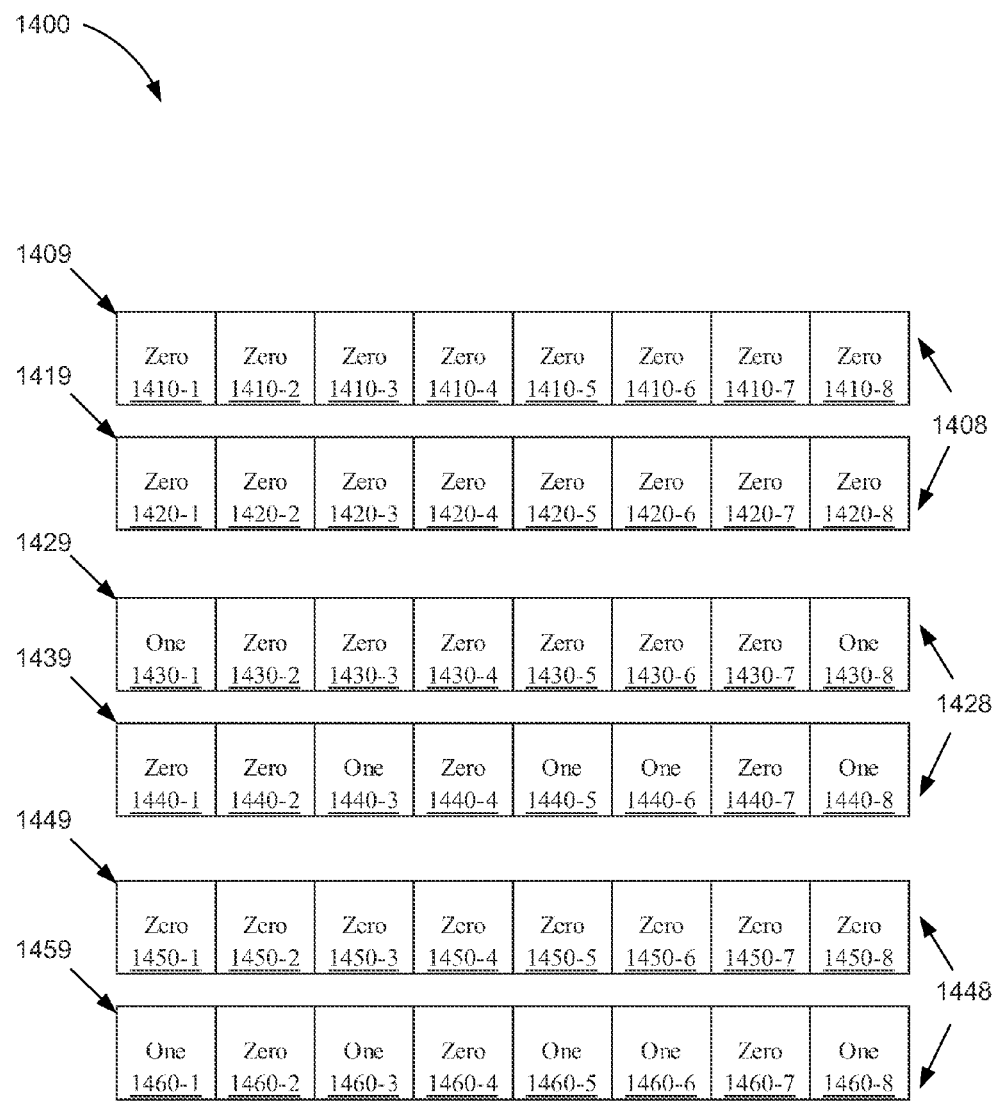

Turning specifically to FIG. 14. In FIG. 14, backup application B (FIG. 6, 601-2) initiates a backup by merging the replica live bitmap B (FIG. 13, 1349, 1449) with the replica consistent backup bitmap B (1459). The replica consistent backup bitmap B (1459) indicates bits 1460-1, 1460-3, 1460-5, 1460-6, and 1460-8 represent blocks of data in the original data set to be backed up. Replica live backup bitmap B (1449) is set to indicate that no additional changes are to be backed up. The backup map (FIG. 13, 1308, 1408) and replica backup map A (1428) remain unchanged to indicate that no action by the supporting system (FIG. 6, 610), backup application A (FIG. 6, 601-1), or the computing device (FIG. 2, 212) has changed the backup map (1408).

Figure 15:
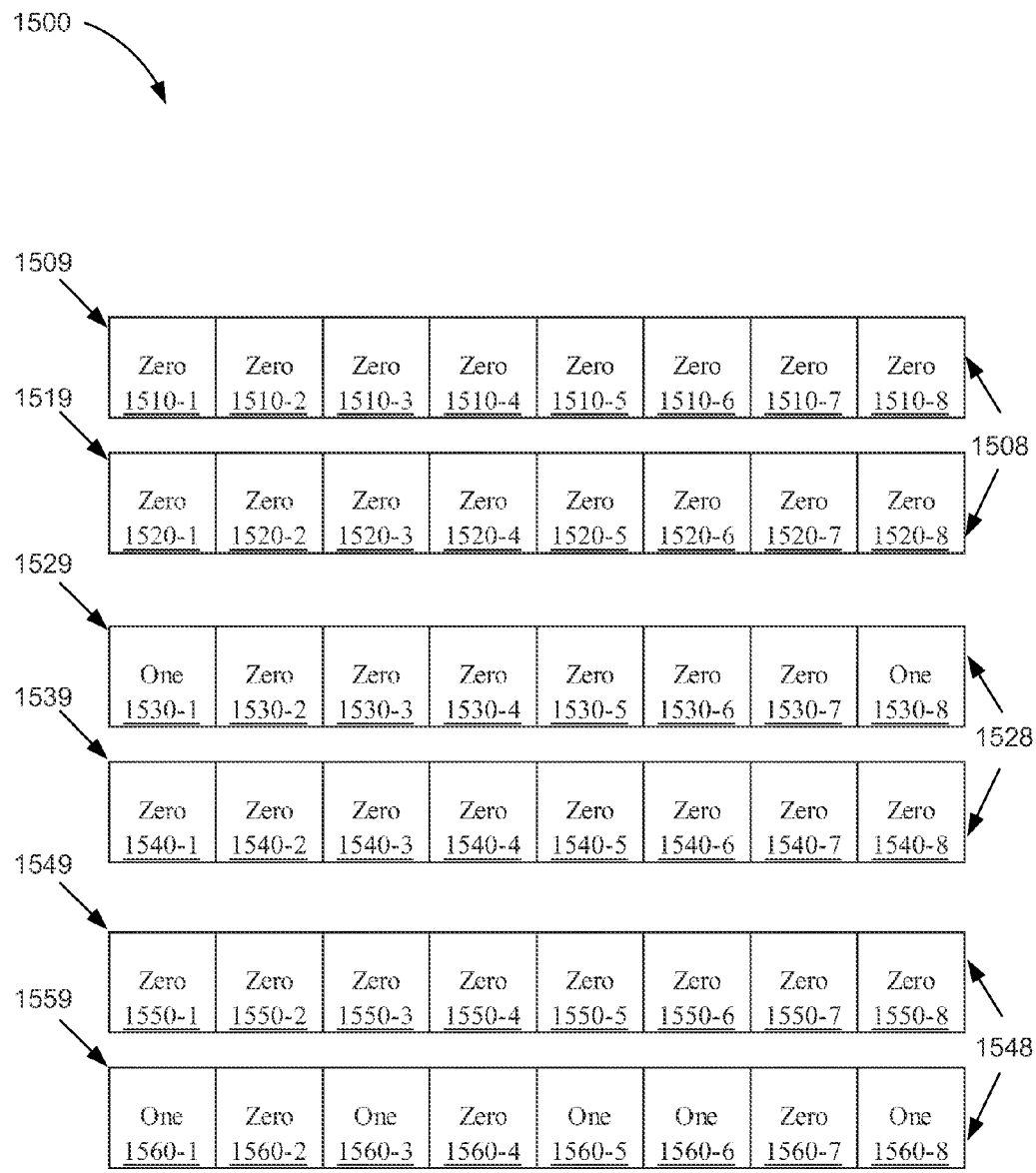

Turning specifically to FIG. 15. In FIG. 15, backup application A (FIG. 6, 601-1) completes a backup, resulting in backup application A (FIG. 6, 601-1) setting replica consistent backup bitmap A (FIG. 14, 1439, 1539) to indicate that the blocks of data in the original data set associated with the replica consistent backup bitmap (1539) are not being backed up. When backup application A (FIG. 6, 601-1) initiates another backup, backup application A (FIG. 6, 601-1) will back up the data indicated by the bits in replica live backup bitmap A (1529). As illustrated, the backup map (FIG. 14, 1408, 1508) and replica backup map B (FIG. 14, 1448, 1548) do not show a change in bits, indicating that no activity has been initiated or completed.

Figure 16:
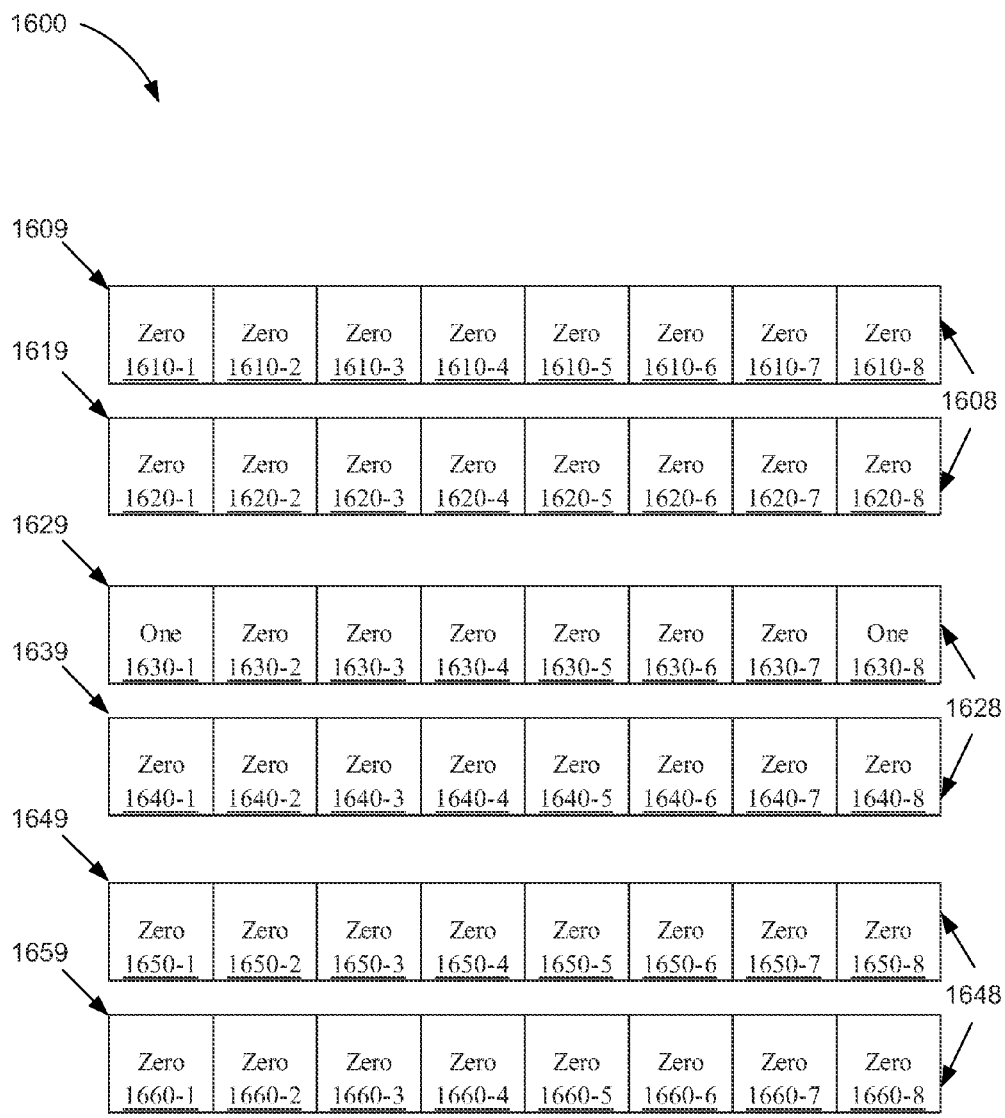

In FIG. 16, backup application B (FIG. 6, 601-2) completes a backup, resulting in backup application B (FIG. 6, 601-2) setting the replica consistent backup bitmap (FIG. 15, 1559, 1659) to indicate that the blocks of data in the original data set associated with the bitmap (1649) are not currently being backed up. As illustrated, the backup map (FIG. 14, 1408, 1508) and replica backup map A (FIG. 15, 1548, 1648) do not show a change in bits, indicating that no activity has been initiated or completed.

While this example shows a particular encoding via values for bits, any number of encodings may be used to generate the encoded data. For example, the encoding may use a high value and a low value.

Figure 17:
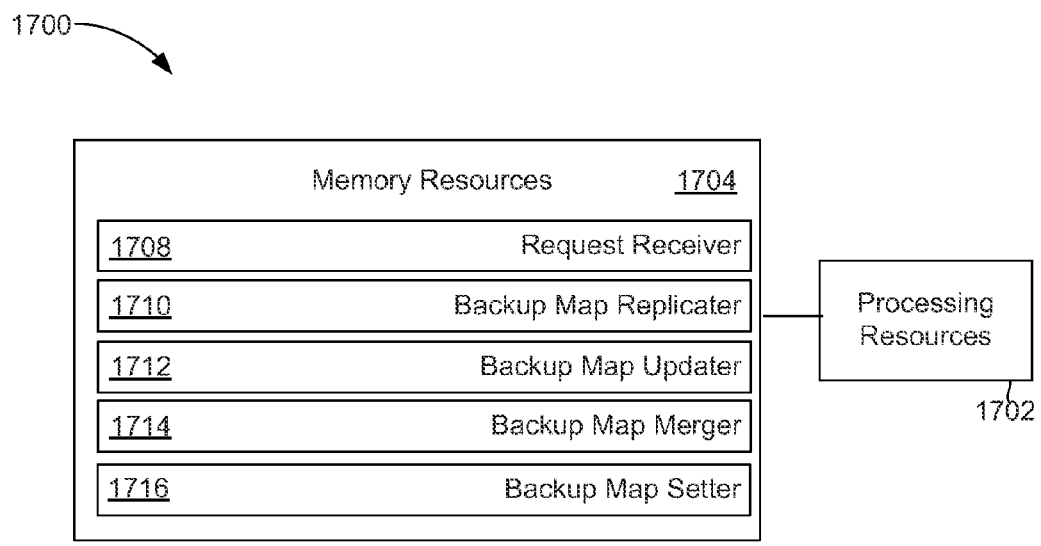
FIG. 17 illustrates a diagram of a system for supporting multiple backup applications using a single change tracker, according to one example of the principles described herein.

FIG. 17 is a diagram of a supporting system (1700), according to one example of the principles described herein. The supporting system (1700) includes processing resources (1702) that are in communication with memory resources (1704). The processing resources (1702) include at least one processor and other resources used to process programmed instructions. The memory resources (1704) generally represent any memory capable of storing data, such as programmed instructions or data structures to be used by the supporting system (1700). The programmed instructions shown stored in the memory resource (1704) include a request receiver (1708), a backup map replicator (1710), a backup map updater (1712), a backup map merger (1714), and a backup map setter (1716).

The request receiver (1708) represents programmed instructions that, when executed, cause the processing resource (1702) to receive, from a backup application, a request to associate with a backup map.

The backup map replicater (1710) represents programmed instructions that, when executed, cause the processing resource (1702) to replicate the backup map, to create a replica backup map associated with the backup application. The backup map updater (1712) represents programmed instructions that, when executed by the processing resource (1702), updates the replica backup map based on changes in the backup map.

The backup map merger (1714) represents programmed instructions that, when executed by the processing resource (1702), merges the backup map with the replica backup map. The backup map setter (1716) represents programmed instructions that, when executed by the processing resource (1702), sets a map. The map may be backup map, a replica backup map, or a combination thereof.

The supporting system (1700) of FIG. 17 may be part of a general purpose computer. However, in alternative examples, the supporting system (1700) is part of an application specific circuit.

The flowchart and block diagrams in the Figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicates otherwise. It will be further understood that the terms "comprises" and/or "comprising," when used in the specification, specify the presence of stated features, integers, operations, elements, and/or components, but do not preclude the presence or addition of a number of other features, integers, operations, elements, components, and/or groups thereof.

What is claimed is:

1. A computer implemented method to support multiple backup applications using a single change tracker, the method comprising, using a processor: receiving, from a first backup application, a request to associate the first backup application with a backup map, wherein the backup map indicates data to be backed up; receiving, from a second backup application, a request to associate the second backup application with the backup map, wherein the second backup application is different from the first backup application; replicating the backup map to create a first replica backup map associated with the first backup application; replicating the backup map to create a second replica backup map associated with the second backup application; and in response to a change to the backup map: updating the first replica backup map responsive to a backup performed by the first backup application; and updating the second replica backup map responsive to a backup performed by the second backup application; wherein: updating the second replica backup map is not responsive to a backup by the first backup application; wherein the multiple backup applications are different and on a different device than an original data set; and the backup applications create backups of the original data set.

2. The method of claim 1 wherein:
the backup map comprises a live backup map and a consistent backup map:
the live backup map indicates data in an original data set on a computing device that has changed since obtaining the backup map; and
the consistent backup map indicates data in the original data set on the computing device that the first backup application is to backup.

3. The method of claim 2, further comprising:
merging the live backup map with the consistent backup map to update a first replica live backup map; and
setting the live backup map to indicate that the consistent backup map has been updated.

4. The method of claim 3, wherein the backup map comprises a live backup bitmap and a consistent backup bitmap and the first replica backup map comprises a first replica live backup bitmap and a first replica consistent backup bitmap.

5. The method of claim 4, wherein merging the live backup map with the consistent backup map to update the first replica live map further comprises merging the live backup bitmap, the consistent backup bitmap, and the first replica live backup bitmap to update the first replica live backup bitmap.

6. A data backup system comprising: a processor to operate multiple backup applications associated with a backup server that manages a backup data set stored on a backup data storage device, wherein the backup applications create different backups of an original data set; a supporting system: comprising a single change tracker that tracks changes in an original data set stored on a data storage device; to generate different replica backup maps for each of the multiple backup applications; where the original data set is backed up by the multiple backup applications, the supporting system communicating with the multiple backup applications; and the multiple backup applications to communicate through the supporting system;

wherein the supporting system comprises a processor; computer program code in a memory, the memory communicatively coupled to the processor, the computer program code when executed causing the processor to: receive, from a first backup application, a request to associate the first backup application with a backup map; receive, from a second backup application, a request to associate the second backup application with the backup map; wherein the multiple backup applications are different and on a different device than the original data set; replicate the backup map to create a first replica backup map, the first replica backup map comprising a first replica live backup map and a first replica consistent backup map; replicate the backup map to create a second replica backup map, the second replica backup map comprising a second replica live backup map and a second replica consistent backup map; update the first replica backup map responsive to a backup performed by the first backup application; update the second replica backup map responsive to a backup performed by the second backup application, wherein: after the update of the first replica backup map and the update of the second replica backup map, the second replica backup map differs from the first replica backup map; and updating the second replica backup map is not responsive to a backup by the first backup application; merge the live backup map and the consistent backup map with the first replica live backup map; and set a backup map; wherein the backup map indicates data to be backed up.

7. The supporting system of claim 6, wherein:
the live backup map and consistent backup map are represented by a live backup bitmap and a consistent backup bitmap, respectively;
the live backup map bitmap to indicate the data in an original data set that has changed since the last obtaining of the live backup bitmap; and
the consistent backup bitmap to indicate the data in the original data set that has been identified for backup.

8. The system of claim 6, wherein the first replica live backup map and the first replica consistent backup map are bitmaps.

9. A computer program product for supporting multiple backup applications using a single change tracker, the computer program product comprising: a non-transitory tangible computer readable storage medium, said tangible computer readable storage medium comprising computer readable program code embodied therewith, said computer readable program code comprising program instructions that, when executed, cause a processor to: receive, from a first backup application, a request to associate the first backup application with a backup map, the backup map: indicating data to be backed up; and comprising a live backup map and a consistent backup map; replicate the backup map to create a first replica backup map, the first replica backup map comprising a first replica live backup map and a first replica consistent backup map; receive, from a second backup application, a request to associate the second backup application with the backup map; replicate the backup map to create a second replica backup map, the second replica backup map comprising a second replica live backup map and a second replica consistent backup map; update the first replica live backup map responsive to a backup performed by the first backup application; and update the second replica live backup map responsive to a backup performed by the second backup application, wherein: the first replica live backup map and the second replica live backup map are different from each other; updating the second replica backup map is not responsive to a backup by the first backup application; wherein the multiple backup applications are different and on a different device than an original data set; and the backup applications create backups of the original data set.

10. The product of claim 9, further comprising computer readable program code comprising program instructions that, when executed, cause said processor to:
merge the live backup map and the consistent backup map with the first replica live backup map; and
set a map to indicate backup activity has occurred.

11. The product of claim 10, wherein the live backup map is a live backup bitmap and the consistent backup map is a consistent backup bitmap.

12. The product of claim 11, wherein the first replica live backup map is a first replica live backup bitmap and the first replica consistent backup map is a first replica consistent backup bitmap.

13. The product of claim 9, wherein the backup map is stored in a backup driver.

14. The method of claim 1, wherein the backup map indicates data to be backed up by indicating data that has changed since a prior backup operation.

15. The method of claim 1, wherein the backup map indicates data to be backed up by indicating data in the original data set that, when changed, is to be backed up.

16. The method of claim 1, wherein the request specifies data in the original data set that the corresponding backup application is to back up.

17. The method of claim 1, wherein the request is received as part of a registration process.

18. The method of claim 4, wherein a bit of the bitmap indicates a block of data that is to be backed up.

* * * * *